United States Patent
Yan et al.

(10) Patent No.: US 10,798,730 B2
(45) Date of Patent: Oct. 6, 2020

(54) UPLINK INFORMATION TRANSMISSION METHOD, TERMINAL DEVICE, AND ACCESS NETWORK DEVICE

(71) Applicant: Huawei Technologies Co., Ltd., Shenzhen (CN)

(72) Inventors: Zhiyu Yan, Shenzhen (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 40 days.

(21) Appl. No.: 16/148,735

(22) Filed: Oct. 1, 2018

(65) Prior Publication Data
US 2019/0037588 A1 Jan. 31, 2019

Related U.S. Application Data

(63) Continuation of application No. PCT/CN2016/078387, filed on Apr. 1, 2016.

(51) Int. Cl.
| | |
|---|---|
| *H04W 4/00* | (2018.01) |
| *H04W 72/12* | (2009.01) |
| *H04L 5/00* | (2006.01) |
| *H04L 27/00* | (2006.01) |

(52) U.S. Cl.
CPC ....... *H04W 72/1284* (2013.01); *H04L 5/0091* (2013.01); *H04L 27/0006* (2013.01)

(58) Field of Classification Search
CPC .. H04L 5/0091; H04L 27/0006; H04W 16/14; H04W 72/02; H04W 72/04; H04W 72/0446; H04W 72/12; H04W 72/1215; H04W 72/1268; H04W 72/1284
See application file for complete search history.

(56) References Cited

U.S. PATENT DOCUMENTS

| | | | |
|---|---|---|---|
| 10,291,377 B2 * | 5/2019 | Hwang | ................. H04L 5/0053 |
| 2014/0362780 A1 | 12/2014 | Malladi et al. | |
| 2016/0095134 A1 | 3/2016 | Chen et al. | |
| 2018/0091242 A1 | 3/2018 | Li et al. | |

(Continued)

FOREIGN PATENT DOCUMENTS

| | | |
|---|---|---|
| CN | 104486013 A | 4/2015 |
| CN | 105309031 A | 2/2016 |

(Continued)

OTHER PUBLICATIONS

Samsung, Discussion on SRS capacity enhancement with increasing UpPTS symbols, 3GPP TSG RAN WG1 Meeting #83, 5 pages, Nov. 2015.*

(Continued)

*Primary Examiner* — Frank Duong
(74) *Attorney, Agent, or Firm* — Gregg L. Jansen

(57) ABSTRACT

An uplink information transmission method, a terminal device, and an access network device are provided. The method includes: obtaining, by a terminal device, indication information for sending uplink information on a first symbol set of a target carrier; and sending, by the terminal device, the uplink information in a second time in a time occupied by the first symbol set. The second time is a time in the time occupied by the first symbol set other than a first time, and is a time in which the terminal device is allowed to access a channel of the target carrier to send the uplink information.

9 Claims, 8 Drawing Sheets

(56) References Cited

U.S. PATENT DOCUMENTS

2018/0323917 A1* 11/2018 Um .................. H04L 5/0053
2019/0090126 A1* 3/2019 Hayashi ............ H04W 72/0446

FOREIGN PATENT DOCUMENTS

| WO | 2015023909 A2 | 2/2015 |
|---|---|---|
| WO | 2015057368 A1 | 4/2015 |
| WO | 2015184216 A1 | 12/2015 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.1.0 (Mar. 2016), pp. 1-129, 3rd Generation Partnership Project—Valbonne, France (Mar. 29, 2016).

"3rd Generation Partnership Project;Technical Specification Group Radio Access Network; Evolved Universal Terrestrial Radio Access (E-UTRA); Physical layer procedure (Release 13)," 3GPP TS 36.213 V13.1.0, pp. 1-361, 3rd Generation Partnership Project—Valbonne, France (Mar. 2016).

"Discussion on enhanced Cat 2-based UL LBT," 3GPP TSG-RAN WG1 Meeting #84, St. Julian's, Malta, R1-160570, pp. 1-5, 3rd Generation Partnership Project, Valbonne, France (Feb. 15-19, 2016).

"Considerations on PUSCH for LAA," 3GPP TSG-RAN WG1 Meeting #84, St. Julian's, Malta, R1-160972, pp. 1-5, 3rd Generation Partnership Project, Valbonne, France (Feb. 15-19, 2016).

"UL LBT for self-carrier scheduling," 3GPP TSG RAN WG1 Meeting #82bis, Malmö, Sweden, R1-155312,, pp. 1-5, 3rd Generation Partnership Project, Valbonne, France (Oct. 5-9, 2015).

"Frame design and signalling for LAA UL based on FS3," 3GPP TSG RAN WG1 Meeting #84, St Julian's, Malta, R1-160336, pp. 1-4, 3rd Generation Partnership Project, Valbonne, France (Feb. 15-19, 2016).

"Discussion on Category 2 LBT for UL transmission," 3GPP TSG RSN WG1 Meeting #82, Beijing, China, R1-154138, pp. 1-5, 3rd Generation Partnership Project, Valbonne, France (Aug. 24-28, 2015).

"Channel Access for the Support of LAA UL," 3GPP TSG RAN WG1 Meeting #84, St Julian's, Malta, R1-160914, pp. 1-7, 3rd Generation Partnership Project, Valbonne, France (Feb. 15-19, 2016).

"Discussion on the UL LBT for LAA," 3GPP TSG Ran WG1 Meeting #84, St Julian's, Malta, R1-160337, pp. 1-5, 3rd Generation Partnership Project, Valbonne, France (Feb. 15-19, 2016).

* cited by examiner

UPLINK INFORMATION TRANSMISSION METHOD, TERMINAL DEVICE, AND ACCESS NETWORK DEVICE

CROSS-REFERENCE TO RELATED APPLICATIONS

This application is a continuation of International Application No. PCT/CN2016/078387, filed on Apr. 1, 2016, the disclosure of which is hereby incorporated by reference in its entirety.

TECHNICAL FIELD

Embodiments of the present invention relate to the field of communications technologies, and in particular, to an uplink information transmission method, a terminal device, and an access network device.

BACKGROUND

Transmission of an uplink service in a Long Term Evolution (LTE) system is scheduled based on an access network device. An elementary time unit of scheduling is a subframe, and one subframe includes a plurality of time-domain symbols. A specific scheduling procedure is: An access network device, for example, a base station (eNodeB), sends a control channel to a terminal device. The control channel may carry scheduling information of a physical uplink shared channel (PUSCH), and the scheduling information includes control information such as resource allocation information and an adjustment and coding scheme. The terminal device receives downlink data or sends uplink information by detecting the scheduling information carried in the control channel. An uplink information channel sent by the terminal device in an uplink subframe is a PUSCH. In an LTE system, an access network device estimates uplink channel qualities in different frequency bands by using a sounding reference signal (SRS) sent by a terminal device.

On an unlicensed spectrum resource, a case in which a plurality of operators of a plurality of communications systems want to occupy a same spectrum exists. To implement a co-existence characteristic that the plurality of communications system do not affect each other in occupying the unlicensed spectrum resource, before sending data on the unlicensed spectrum resource, a terminal device first monitors whether a channel is idle. If the channel is idle, the terminal device may use the channel on the unlicensed spectrum resource. The terminal device may perform clear channel assessment (CCA) through energy detection, to detect whether the channel is idle.

In the conventional art, a method for sending uplink information by a terminal device on an unlicensed spectrum resource is: If an access network schedules a terminal device to send uplink information in a plurality of consecutive uplink subframes, the terminal device performs CCA before sending the uplink information in the first of the scheduled plurality of consecutive uplink subframes. If a detection result is that the terminal device is not allowed to access the channel, the terminal device cannot send the uplink information in next one or more consecutive uplink subframes. However, in fact, in subsequent uplink subframes, the terminal device has an opportunity to access the channel on the unlicensed spectrum to send the uplink information. Therefore, the method affects use efficiency of the unlicensed spectrum resource.

SUMMARY

Embodiments of the present invention provide an uplink information transmission method, a terminal device, and an access network device, so that when a plurality of transmission channels of a terminal device for uplink information that are consecutive in time share one detection to detect whether the terminal device is allowed to access a channel, if a channel detection result before the first transmission channel is that the terminal device is not allowed to access the channel, the terminal device may attempt to access a subsequent transmission channel to send the uplink information, thereby improving channel use efficiency.

According to a first aspect, an embodiment of the present invention provides an uplink information transmission method, including:

obtaining, by a terminal device, indication information for sending uplink information on a first symbol set of a target carrier; and sending, by the terminal device, the uplink information in a second time in a time occupied by the first symbol set, where the second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the terminal device is scheduled to send the uplink information. Therefore, when a plurality of transmission channels for uplink information share one detection to detect whether a terminal device is allowed to access a channel, if a channel detection result before the first transmission channel is that the terminal device is not allowed to access the channel, the terminal device may attempt to access a transmission channel subsequent to the first transmission channel to send the uplink information, thereby improving channel use efficiency.

In a possible design, the first time is a time occupied by the first symbol or the first two symbols in the first symbol set.

Further, before the sending, by the terminal device, the uplink information in a second time in a time occupied by the first symbol set, the method further includes:

detecting, by the terminal device in all or a part of the first time, that the terminal device is allowed to access the channel of the target carrier.

In a possible design, the terminal device sends no uplink information on the second symbol set.

In a possible design, the first symbol set includes a symbol in a reference symbol set in an uplink subframe in which the first symbol set is located; or the first symbol set neither includes a symbol in a reference symbol set in an uplink subframe in which the first symbol set is located nor includes at least one symbol after the reference symbol set in the uplink subframe in which the first symbol set is located; and the symbol in the reference symbol set is a symbol that is in the uplink subframe in which the first symbol set is located and that is occupied by a time used by the terminal device or another terminal device to detect whether the terminal device or the another terminal device is allowed to access the channel of the target carrier.

Specifically, the uplink information includes a sounding reference signal SRS and/or a physical uplink shared channel PUSCH.

According to a second aspect, an embodiment of the present invention provides an uplink information transmission method, including:

sending, by an access network device, indication information used to instruct a terminal device to send uplink information on a first symbol set of a target carrier; and receiving, by the access network device, the uplink information in a second time in a time occupied by the first symbol set, where the second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the access network device schedules the terminal device to send the uplink information. Therefore, when a plurality of transmission channels for uplink information share one detection to detect whether a terminal device is allowed to access a channel, if a channel detection result before the first transmission channel is that the terminal device is not allowed to access the channel, the terminal device may attempt to access a transmission channel subsequent to the first transmission channel to send the uplink information, thereby improving channel use efficiency.

In a possible design, the first time is a time occupied by the first symbol or the first two symbols in the first symbol set.

Further, the method further includes:

determining, by the access network device, that the terminal device sends no uplink information on the second symbol set.

In a possible design, the first symbol set includes a symbol in a reference symbol set in an uplink subframe in which the first symbol set is located; or the first symbol set neither includes a symbol in a reference symbol set in an uplink subframe in which the first symbol set is located nor includes at least one symbol after the reference symbol set in the uplink subframe in which the first symbol set is located; and the symbol in the reference symbol set is a symbol that is in the uplink subframe in which the first symbol set is located and that is occupied by a time used by the terminal device or another terminal device to detect whether the terminal device or the another terminal device is allowed to access the channel of the target carrier.

Specifically, the uplink information includes a sounding reference signal SRS and/or a physical uplink shared channel PUSCH.

According to a third aspect, an embodiment of the present invention provides an uplink information transmission method, including:

obtaining, by a terminal device, first indication information for sending first uplink information on a first symbol set of a target carrier; and sending, by the terminal device, the first uplink information on the first symbol set, where there is at least one symbol set that is before the first symbol set and that is a symbol set on which an access network device schedules the terminal device to send second uplink information, and the last symbol in symbols included in the at least one symbol set is adjacent in time to the first symbol in the first symbol set. Therefore, when a plurality of symbol sets scheduled by the access network device to the terminal device share one channel detection, if a channel detection result of a previous symbol set is that the terminal device is not allowed to access the channel, the terminal device may further attempt to send the uplink information on a next symbol set, thereby improving channel use efficiency.

In a possible design, before the sending, by the terminal device, the first uplink information on the first symbol set, the method further includes:

detecting, by the terminal device in a first time in a symbol 1 before the first symbol in the first symbol set, that the terminal device is allowed to access a channel of the target carrier.

Optionally, the at least one symbol set includes a second symbol set, the second symbol set is a symbol set on which the access network device instructs, by using second indication information, the terminal device to send the second uplink information, an uplink subframe in which the second symbol set is located includes a symbol 2, a second time in the symbol 2 is a time that is in the uplink subframe in which the second symbol set is located and that is used by the terminal device or another terminal device to detect whether the terminal device or the another terminal device is allowed to access the channel of the target carrier, and the symbol 2 does not overlap a symbol in the second symbol set.

In a possible design, the terminal device detects, in the second time, that the terminal device is not allowed to access the channel of the target carrier; or the terminal device does not receive the second indication information.

In a possible design, the symbol 1 is adjacent in time to the first symbol in the first symbol set.

Specifically, the first uplink information includes a sounding reference signal SRS and/or a physical uplink shared channel PUSCH; and/or the second uplink information includes an SRS and/or a PUSCH.

According to a fourth aspect, an embodiment of the present invention provides an uplink information transmission method, including:

sending, by an access network device, first indication information used to instruct a terminal device to send first uplink information on a first symbol set of a target carrier; and receiving, by the access network device, the first uplink information on the first symbol set. There is at least one symbol set that is before the first symbol set and that is a symbol set on which the access network device schedules the terminal device to send second uplink information, and the last symbol in symbols included in the at least one symbol set is adjacent in time to the first symbol in the first symbol set. Therefore, when a plurality of symbol sets scheduled by the access network device to the terminal device share one channel detection, if a channel detection result of a previous symbol set is that the terminal device is not allowed to access the channel, the terminal device may further attempt to send the uplink information on a next symbol set, thereby improving channel use efficiency.

In a possible design, the method further includes:

determining, by the access network device, that the terminal device sends no uplink information on the at least one symbol set or a symbol set adjacent to the first symbol set.

In a possible design, the at least one symbol set includes a second symbol set, and the second symbol set is a symbol set on which the access network device instructs, by using second indication information, the terminal device to send the second uplink information. An uplink subframe in which the second symbol set is located includes a symbol 2, all or a part of a second time in the symbol 2 is a time that is in the uplink subframe in which the second symbol set is located and that is used by the terminal device or another terminal device to detect whether the terminal device or the another terminal device is allowed to access a channel of the target carrier, and the symbol 2 does not overlap a symbol in the second symbol set.

Specifically, the first uplink information includes a sounding reference signal SRS and/or a physical uplink shared channel PUSCH; and/or the second uplink information includes an SRS and/or a PUSCH.

According to a fifth aspect, an embodiment of the present invention provides a terminal device, including:

a receiving module, configured to obtain indication information for sending uplink information on a first symbol set of a target carrier; and a sending module, configured to send the uplink information in a second time in a time occupied by the first symbol set, where the second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the terminal device is scheduled to send the uplink information.

In a possible design, the first time is a time occupied by the first symbol or the first two symbols in the first symbol set.

In a possible design, the method further includes:

a processing module, configured to: before the sending module sends the uplink information in the second time in the time occupied by the first symbol set, detect, in all or a part of the first time, that the terminal device is allowed to access the channel of the target carrier.

In a possible design, the sending module sends no uplink information on the second symbol set.

In a possible design, the first symbol set includes a symbol in a reference symbol set in an uplink subframe in which the first symbol set is located; or the first symbol set neither includes a symbol in a reference symbol set in an uplink subframe in which the first symbol set is located nor includes at least one symbol after the reference symbol set in the uplink subframe in which the first symbol set is located, and the symbol in the reference symbol set is a time occupied by a time that is in the uplink subframe in which the first symbol set is located and that is used by the processing module or another terminal device to detect whether the terminal device or the another terminal device is allowed to access the channel of the target carrier.

Specifically, the uplink information includes a sounding reference signal SRS and/or a physical uplink shared channel PUSCH.

According to a sixth aspect, an embodiment of the present invention provides an access network device, including:

a sending module, configured to send indication information used to instruct a terminal device to send uplink information on a first symbol set of a target carrier; and a receiving module, configured to receive the uplink information in a second time in a time occupied by the first symbol set, where the second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the access network device schedules the terminal device to send the uplink information.

In a possible design, the first time is a time occupied by the first symbol or the first two symbols in the first symbol set.

In a possible design, the method further includes:

a processing module, configured to determine that the terminal device sends no uplink information on the second symbol set.

In a possible design, the first symbol set includes a symbol in a reference symbol set in an uplink subframe in which the first symbol set is located; or the first symbol set neither includes a symbol in a reference symbol set in an uplink subframe in which the first symbol set is located nor includes at least one symbol after the reference symbol set in the uplink subframe in which the first symbol set is located; and the symbol in the reference symbol set is a symbol that is in the uplink subframe in which the first symbol set is located and that is occupied by a time used by the terminal device or another terminal device to detect whether the terminal device or the another terminal device is allowed to access the channel of the target carrier.

Specifically, the uplink information includes a sounding reference signal SRS and/or a physical uplink shared channel PUSCH.

According to a seventh aspect, an embodiment of the present invention provides a terminal device, including:

a receiving module, configured to obtain first indication information for sending first uplink information on a first symbol set of a target carrier; and a sending module, configured to send the first uplink information on the first symbol set. There is at least one symbol set that is before the first symbol set and that is a symbol set on which an access network device schedules the terminal device to send second uplink information, and the last symbol in symbols included in the at least one symbol set is adjacent in time to the first symbol in the first symbol set.

In a possible design, the method further includes:

a processing module, configured to: before the sending module sends the first uplink information on the first symbol set, detect, in a first time in a first symbol before the first symbol in the first symbol set, that the terminal device is allowed to access a channel of the target carrier.

In a possible design, the at least one symbol set includes a second symbol set, and the second symbol set is a symbol set on which the access network device instructs, by using second indication information, the terminal device to send the second uplink information. An uplink subframe in which the second symbol set is located includes a symbol 2, a second time in the symbol 2 is a time that is in the uplink subframe in which the second symbol set is located and that is used by the processing module or another terminal device to detect whether the terminal device or the another terminal device is allowed to access the channel of the target carrier, and the symbol 2 does not overlap a symbol in the second symbol set.

In a possible design, the processing module detects, in the second time, that the terminal device is not allowed to access the channel of the target carrier. Alternatively, the receiving module does not receive the second indication information.

In a possible design, the first symbol is adjacent in time to the first symbol in the first symbol set.

Specifically, the first uplink information includes a sounding reference signal SRS and/or a physical uplink shared channel PUSCH; and/or the second uplink information includes an SRS and/or a PUSCH.

According to an eighth aspect, an embodiment of the present invention provides an access network device, including:

a sending module, configured to send first indication information used to instruct a terminal device to send first uplink information on a first symbol set of a target carrier; and a receiving module, configured to receive the first uplink information on the first symbol set. There is at least one symbol set that is before the first symbol set and that is a symbol set on which the access network device schedules the terminal device to send second uplink information, and the last symbol in symbols included in the at least one symbol set is adjacent in time to the first symbol in the first symbol set.

In a possible design, the method further includes:

a processing module, configured to determine that the terminal device sends no uplink information on the at least one symbol set or a symbol set adjacent to the first symbol set.

In a possible design, the at least one symbol set includes a second symbol set, and the second symbol set is a symbol set on which the access network device instructs, by using second indication information, the terminal device to send the second uplink information. An uplink subframe in which the second symbol set is located includes a symbol 2, all or a part of a second time in the symbol 2 is a time that is in the uplink subframe in which the second symbol set is located and that is used by the terminal device or another terminal device to detect whether the terminal device or the another terminal device is allowed to access a channel of the target carrier, and the symbol 2 does not overlap a symbol in the second symbol set.

Specifically, the first uplink information includes a sounding reference signal SRS and/or a physical uplink shared channel PUSCH; and/or the second uplink information includes an SRS and/or a PUSCH.

According to a ninth aspect, an embodiment of the present invention provides a terminal device, including:

a receiver, configured to obtain indication information for sending uplink information on a first symbol set of a target carrier; and a transmitter, configured to send the uplink information in a second time in a time occupied by the first symbol set, where the second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the terminal device is scheduled to send the uplink information.

In a possible design, the first time is a time occupied by the first symbol or the first two symbols in the first symbol set.

In a possible design, the method further includes:

a processor, configured to: before the transmitter sends the uplink information in the second time in the time occupied by the first symbol set, detect, in all or a part of the first time, that the terminal device is allowed to access the channel of the target carrier.

In a possible design, the transmitter sends no uplink information on the second symbol set.

In a possible design, the first symbol set includes a symbol in a reference symbol set in an uplink subframe in which the first symbol set is located; or the first symbol set neither includes a symbol in a reference symbol set in an uplink subframe in which the first symbol set is located nor includes at least one symbol after the reference symbol set in the uplink subframe in which the first symbol set is located; and the symbol in the reference symbol set is a symbol that is in the uplink subframe in which the first symbol set is located and that is occupied by a time used by the processor or another terminal device to detect whether the terminal device or the another terminal device is allowed to access the channel of the target carrier.

Specifically, the uplink information includes a sounding reference signal SRS and/or a physical uplink shared channel PUSCH.

According to a tenth aspect, an embodiment of the present invention provides an access network device, including:

a transmitter, configured to send indication information used to instruct a terminal device to send uplink information on a first symbol set of a target carrier; and a receiver, configured to receive the uplink information in a second time in a time occupied by the first symbol set, where the second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the access network device schedules the terminal device to send the uplink information.

In a possible design, the first time is a time occupied by the first symbol or the first two symbols in the first symbol set.

In a possible design, the method further includes:

a processor, configured to determine that the terminal device sends no uplink information on the second symbol set.

In a possible design, the first symbol set includes a symbol in a reference symbol set in an uplink subframe in which the first symbol set is located; or the first symbol set neither includes a symbol in a reference symbol set in an uplink subframe in which the first symbol set is located nor includes at least one symbol after the reference symbol set in the uplink subframe in which the first symbol set is located; and the symbol in the reference symbol set is a time occupied by a time that is in the uplink subframe in which the first symbol set is located and that is used by the terminal device or another terminal device to detect whether the terminal device or the another terminal device is allowed to access the channel of the target carrier.

Specifically, the uplink information includes a sounding reference signal SRS and/or a physical uplink shared channel PUSCH.

According to an eleventh aspect, an embodiment of the present invention provides a terminal device, including:

a receiver, configured to obtain first indication information for sending first uplink information on a first symbol set of a target carrier; and a transmitter, configured to send the first uplink information on the first symbol set. There is at least one symbol set that is before the first symbol set and that is a symbol set on which an access network device schedules the terminal device to send second uplink information, and the last symbol in symbols included in the at least one symbol set is adjacent in time to the first symbol in the first symbol set.

In a possible design, the method further includes:

a processor, configured to: before the transmitter sends the first uplink information on the first symbol set, detect, in a first time in a symbol 1 before the first symbol in the first symbol set, that the terminal device is allowed to access a channel of the target carrier.

In a possible design, the at least one symbol set includes a second symbol set, and the second symbol set is a symbol set on which the access network device instructs, by using second indication information, the terminal device to send the second uplink information. An uplink subframe in which the second symbol set is located includes a symbol 2, a second time in the symbol 2 is a time that is in the uplink subframe in which the second symbol set is located and that is used by the processor or another terminal device to detect whether the terminal device or the another terminal device is allowed to access the channel of the target carrier, and the symbol 2 does not overlap a symbol in the second symbol set.

In a possible design, the processor detects, in the second time, that the terminal device is not allowed to access the channel of the target carrier. Alternatively, the receiver does not receive the second indication information.

In a possible design, the symbol 1 is adjacent in time to the first symbol in the first symbol set.

Specifically, the first uplink information includes a sounding reference signal SRS and/or a physical uplink shared channel PUSCH; and/or the second uplink information includes an SRS and/or a PUSCH.

According to a twelfth aspect, an embodiment of the present invention provides an access network device, including:

a transmitter, configured to send first indication information used to instruct a terminal device to send first uplink information on a first symbol set of a target carrier; and a receiver, configured to receive the first uplink information on the first symbol set. There is at least one symbol set that is before the first symbol set and that is a symbol set on which the access network device schedules the terminal device to send second uplink information, and the last symbol in symbols included in the at least one symbol set is adjacent in time to the first symbol in the first symbol set.

In a possible design, the method further includes:

a processor, configured to determine that the terminal device sends no uplink information on the at least one symbol set or a symbol set adjacent to the first symbol set.

In a possible design, the at least one symbol set includes a second symbol set, and the second symbol set is a symbol set on which the access network device instructs, by using second indication information, the terminal device to send the second uplink information. An uplink subframe in which the second symbol set is located includes a symbol 2, all or a part of a second time in the symbol 2 is a time that is in the uplink subframe in which the second symbol set is located and that is used by the terminal device or another terminal device to detect whether the terminal device or the another terminal device is allowed to access a channel of the target carrier, and the symbol 2 does not overlap a symbol in the second symbol set.

Specifically, the first uplink information includes a sounding reference signal SRS and/or a physical uplink shared channel PUSCH; and/or the second uplink information includes an SRS and/or a PUSCH.

Compared with the conventional art, in the solutions provided in the embodiments of the present invention, when a plurality of transmission channels for uplink information share one detection to detect whether a terminal device is allowed to access a channel, if a channel detection result before the first transmission channel is that the terminal device is not allowed to access the channel, the terminal device may attempt to access a transmission channel subsequent to the first transmission channel to send the uplink information, thereby improving channel use efficiency.

BRIEF DESCRIPTION OF DRAWINGS

To describe the technical solutions in the embodiments of the present invention or in the conventional art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied to various communications systems in a wireless cellular network, such as: a Global System for Mobile Communications (GSM), a Code Division Multiple Access (CDMA) system, a Wideband Code Division Multiple Access (WCDMA) system, a general packet radio service (GPRS) system, an LTE system, or a Universal Mobile Telecommunications System (UMTS), which is not limited in the embodiments of the present invention.

The technical solutions in the embodiments of the present invention are mainly applied to an LTE system, and particularly, to a licensed-assisted access (LAA) system in which uplink information is sent on an unlicensed spectrum resource. Network elements in a communications system to which the embodiments of the present invention are applied are an access network device (for example, a base station) and a terminal device.

Embodiments of the present invention provide an uplink information transmission method, a terminal device, and an access network device, so that when a plurality of transmission channels of a terminal device for uplink information that are consecutive in time share one detection to detect whether the terminal device is allowed to access a channel, if a channel detection result before the first transmission channel is that the terminal device is not allowed to access the channel, the terminal device may attempt to access a subsequent transmission channel to send the uplink information, thereby improving channel use efficiency. A specific method is: If a terminal device detects, before the first transmission channel, that the terminal device is not allowed to access a channel, the terminal device attempts, in or before a time occupied by a symbol set of a subsequent transmission channel, to detect whether the terminal device is allowed to access the channel. If detecting that the terminal device is allowed to access the channel, the terminal device sends uplink information on the symbol set of the subsequent transmission channel. Correspondingly, an access network device receives the uplink information on the symbol set of the subsequent transmission channel. The technical solutions provided in the embodiments of the present invention are described below in detail with reference to the accompanying drawings.

Figure 1:
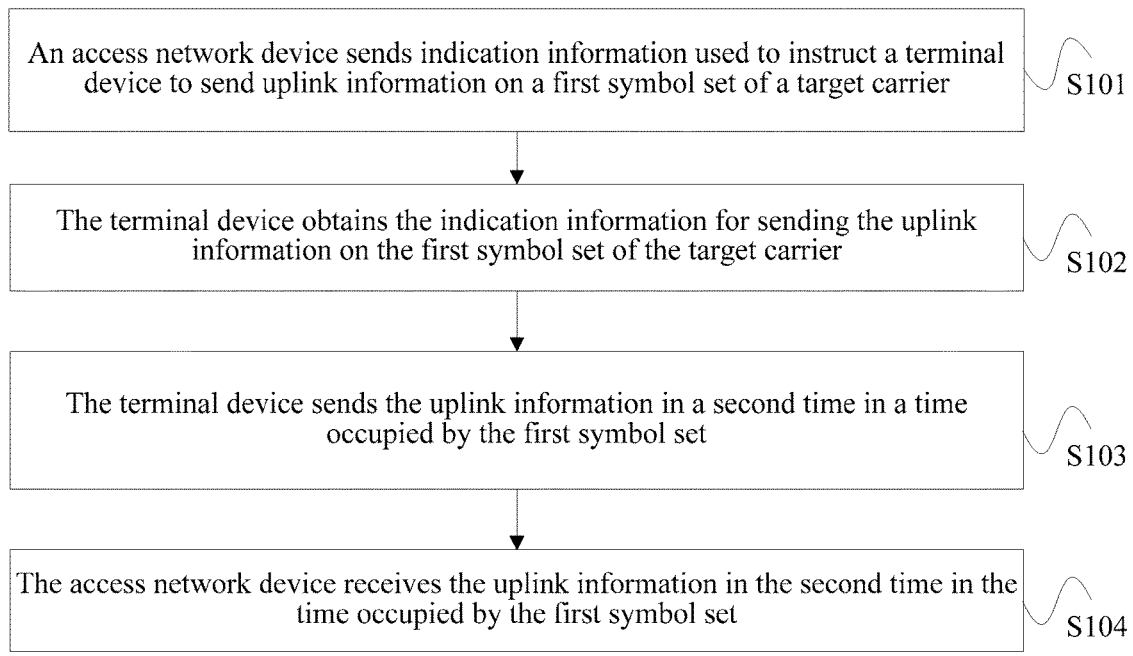
FIG. 1 is a schematic flowchart of Embodiment 1 of an uplink information transmission method according to the present invention.

FIG. 1 is a schematic flowchart of Embodiment 1 of an uplink information transmission method according to the present invention. As shown in FIG. 1, the method includes the following steps.

S101: An access network device sends indication information used to instruct a terminal device to send uplink information on a first symbol set of a target carrier.

Specifically, the first symbol set includes a plurality of symbols. The terminal device sends the uplink information in a time corresponding to a symbol included in the first symbol set of the target carrier. There is a second symbol set before the first symbol set. The "before" herein is "before" in time. The last symbol in the second symbol set is adjacent in time to the first symbol in the first symbol set, and the second symbol set and the first symbol set are symbol sets on which the access network device schedules the terminal device to send the uplink information.

Figure 2:
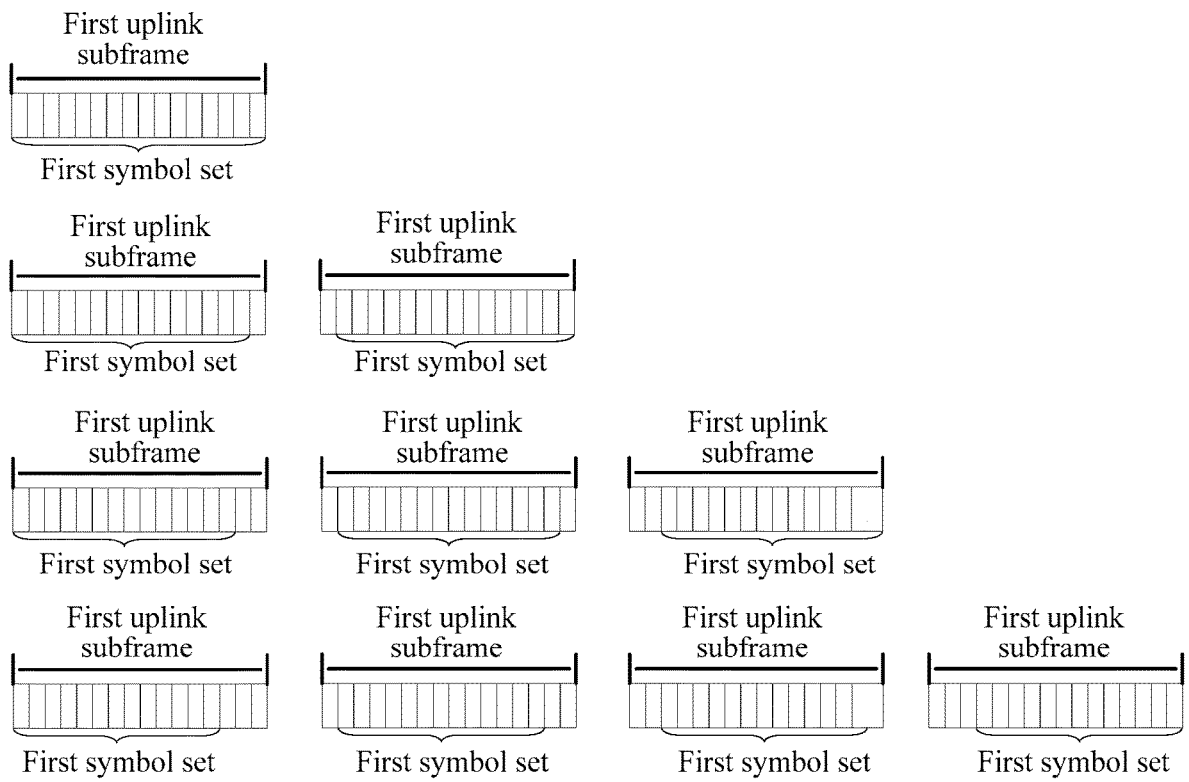
FIG. 2 is a plurality of schematic diagrams of a quantity of symbols included in a first symbol set in a first uplink subframe in Embodiment 1 of an uplink information transmission method according to the present invention.

For example, the access network device schedules the terminal device to send uplink information on a first symbol set in a first uplink subframe of the target carrier. A total quantity of symbols included in the first uplink subframe is 14, and the first symbol set may include 14 symbols, 13 symbols, 12 symbols, or 11 symbols. FIG. 2 is a plurality of schematic diagrams of a quantity of symbols included in the first symbol set in the first uplink subframe in Embodiment 1 of the uplink information transmission method according to the present invention. As shown in FIG. 2, the first symbol set may be any one of ten cases in FIG. 2.

That the access network device sends the indication information used to instruct the terminal device to send the uplink information on the first symbol set of the target carrier may be that the access network device sends an uplink scheduling grant to the terminal device. The uplink scheduling grant is used to instruct the terminal device to send uplink information on a first symbol set in a first uplink subframe of the target carrier. The uplink scheduling grant may correspond to the first uplink subframe only, that is, the access network device sends the uplink scheduling grant once to schedule the terminal device to send the uplink information in one uplink subframe. Alternatively, the uplink scheduling grant may correspond to a plurality of uplink subframes, that is, the access network device sends the uplink scheduling grant once to schedule the terminal device to send the uplink information in the plurality of uplink subframes. It should be noted that this is not limited in this embodiment of the present invention, provided that the access network device sends the uplink scheduling grant and the uplink scheduling grant has information used to schedule the terminal device to send the uplink information on the first symbol set in the first uplink subframe of the target carrier.

Further, in addition to instructing, by using the indication information, the terminal device to send the uplink information on the first symbol set of the target carrier, the access network device may further indicate, to the terminal device by using indication information, that the second symbol set of the target carrier is a symbol set on which the access network device schedules the terminal device to send uplink information. The last symbol in symbols included in the second symbol set is adjacent in time to the first symbol in the first symbol set. The uplink information is an SRS and/or a PUSCH. The indication information used to instruct the terminal device to send the uplink information on the first symbol set of the target carrier may be the same as or may be different from the indication information used to instruct the terminal device to send the uplink information on the second symbol set. This is not limited herein.

The second symbol set includes at least one symbol.

Figure 3:
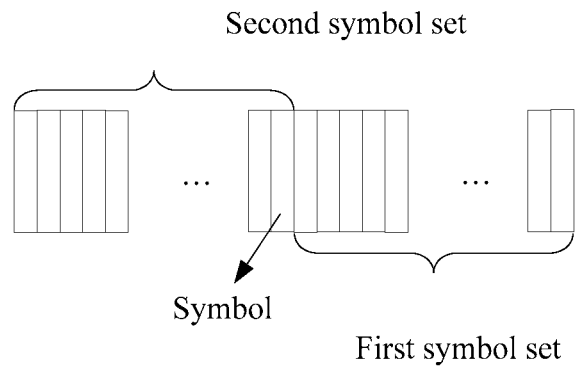
FIG. 3 is a schematic diagram of a symbol set used to instruct, by using indication information sent by an access network device, a terminal device to send uplink information on a target carrier in Embodiment 1 of an uplink information transmission method according to the present invention.

For example, FIG. 3 is a schematic diagram of a symbol set used to instruct, by using the indication information sent by the access network device, the terminal device to send the uplink information on the target carrier in Embodiment 1 of the uplink information transmission method according to the present invention. As shown in FIG. 3, in addition to instructing, by using the indication information, the terminal device to send the uplink information on the first symbol set of the target carrier, the access network device further instructs, by using indication information, the terminal device to send uplink information on the second symbol set. The last symbol in symbols included in the second symbol set is adjacent in time to the first symbol in the first symbol set. For example, the symbols in the second symbol set include the second to the $14^{th}$ symbols in a second uplink subframe, and symbols in the first symbol set include the first to the $14^{th}$ symbols in the first uplink subframe. The access network device instructs the terminal device to send a first PUSCH on the first symbol set and send a second PUSCH on the second symbol set. For example, a symbol 2 is the second symbol in the first uplink subframe, and the symbols in the first symbol set include the third to the $14^{th}$ symbols in the first uplink subframe. The access network device instructs the terminal device to send a first PUSCH on the second symbol set and send an SRS on the second symbol set.

Further, there may further be one or more symbol sets before the second symbol set. A quantity of symbol sets that are before the first symbol set and on which the access network device instructs the terminal device to send uplink information is not limited in this embodiment of the present invention. That is, there may be a third symbol set or more symbol sets that are before the second symbol set and that are symbol sets on which the access network device schedules the terminal device to send uplink information. The first symbol and the last symbol in every two of the symbol sets are adjacent in time. That is, in the symbol sets adjacent in time to the first symbol set, the last symbol in the first symbol set is adjacent to the first symbol in the second symbol set, the last symbol in the second symbol set is adjacent to the first symbol in the third symbol set, . . . , and the last symbol in the last but one symbol set is adjacent to the first symbol in the last symbol set.

S102: The terminal device obtains the indication information for sending the uplink information on the first symbol set of the target carrier.

Specifically, the terminal device obtains, based on the received uplink scheduling grant, the indication information used to instruct the terminal device to send the uplink information on the first symbol set of the target carrier.

S103: The terminal device sends the uplink information in a second time in a time occupied by the first symbol set.

Specifically, the second time is a time in the time occupied by the first symbol set other than a first time. The second time is a time in which the terminal device is allowed to access a channel of the target carrier to send the uplink information, regardless of which manner is used by the terminal device to learn of being allowed to access the channel of the target carrier. The first time may be a time occupied by the first symbol or the first two symbols in the first symbol set, or may be a part of a time occupied by the first symbol in the first symbol set, for example, a time of a half symbol. All or a part of the first time is a time used by the terminal device to detect whether the terminal device is allowed to access the channel. The time of sending the uplink information by the terminal device includes a time of sending a reference signal corresponding to the uplink information.

S104: The access network device receives the uplink information in the second time in the time occupied by the first symbol set.

Optionally, the access network device determines that the terminal device sends no uplink information on the second symbol set. A method for determining, by the access network device, that the terminal device sends no uplink information on the second symbol set is not limited herein. For example, the access network device may not detect a demodulation reference signal sent by the terminal device on a symbol that is occupied by the demodulation reference signal and that is in the second symbol set, to determine that the terminal device sends no uplink information on the second symbol set. Alternatively, the access network device may determine, by using another method, that the terminal device sends no uplink information on the second symbol set.

In the uplink information transmission method provided in this embodiment, after obtaining the indication information for sending the uplink information on the first symbol set of the target carrier, the terminal device sends the uplink information in the second time in the time occupied by the first symbol set. The second time is a time in which the terminal device is allowed to access the channel of the target carrier to send the uplink information. The access network device receives the uplink information in the second time in the time occupied by the first symbol set of the target carrier. Therefore, when a plurality of transmission channels for uplink information share one detection to detect whether a terminal device is allowed to access a channel, if a channel detection result before the first transmission channel is that the terminal device is not allowed to access the channel, the terminal device may attempt to access a transmission channel subsequent to the first transmission channel to send the uplink information, thereby improving channel use efficiency.

Optionally, before the sending, by the terminal device, the uplink information in a second time in the first symbol set, the method may further include: detecting, by the terminal device in all or a part of the first time, that the terminal device is allowed to access the channel of the target carrier. That is, the terminal device detects, in all or a part of the first time, whether the terminal device is allowed to access the channel (detecting whether the channel is idle). If detecting that the terminal device is allowed to access the channel, the terminal device sends the uplink information in a remaining time in the first symbol set. The terminal device performs channel detection in all or a part of the first time in the first symbol set, to learn whether the terminal device is allowed to access the channel in the remaining time in the first symbol set. When being allowed to access the channel, the terminal device sends the uplink information in the remaining time (that is, the second time) in the first symbol set.

Figure 4:
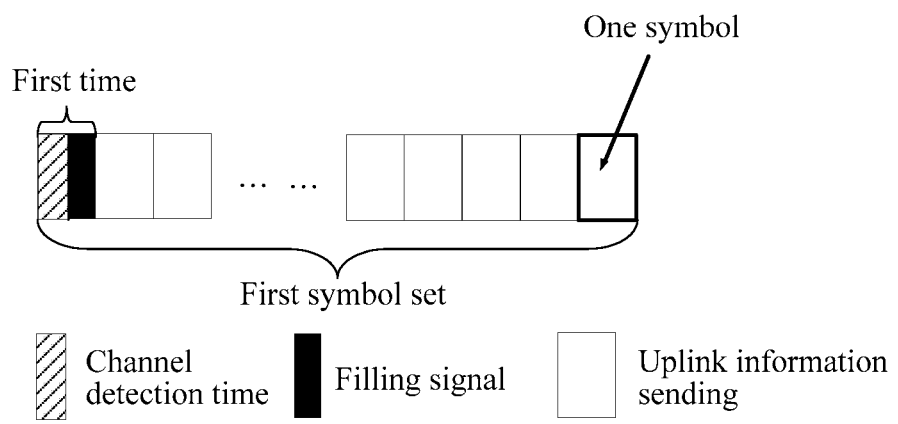
FIG. 4 is a schematic diagram of performing channel detection by a terminal device by using a part of a first time in Embodiment 1 of an uplink information transmission method according to the present invention.

FIG. 4 is a schematic diagram of performing channel detection by the terminal device by using a part of the first time in Embodiment 1 of the uplink information transmission method according to the present invention. As shown in FIG. 4, a part of the first time is a time used by the terminal device to detect whether the terminal device is allowed to access the channel of the target carrier. After detecting, in a part of the first time, that the terminal device is allowed to access the channel of the target carrier, the terminal device sends a filling signal to occupy the channel, and does not start to send the uplink information in a time in the first symbol set other than the first time until an end time point of the first time.

Figure 5:
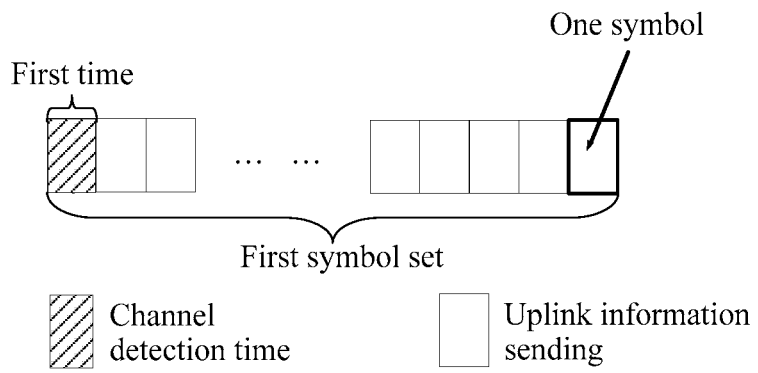
FIG. 5 is a schematic diagram of performing channel detection by a terminal device by using all of a first time in Embodiment 1 of an uplink information transmission method according to the present invention.

FIG. 5 is a schematic diagram of performing channel detection by the terminal device by using all of the first time in Embodiment 1 of the uplink information transmission method according to the present invention. As shown in FIG. 5, all of the first time is a time used by the terminal device to detect whether the terminal device is allowed to access the channel. After detecting, in the first time, that the terminal device is allowed to access the channel of the target carrier, the terminal device sends the uplink information in a time in the first symbol set other than the first time.

Further, before performing channel detection in all or a part of the first time in the first symbol set, the terminal device sends no uplink channel on the second symbol set.

In addition to instructing, by using the indication information, the terminal device to send the uplink information on the first symbol set of the target carrier, the access network device further instructs, by using indication information, the terminal device to send uplink information on the second symbol set before the first symbol set, and the last symbol in the symbols included in the second symbol set is adjacent in time to the first symbol in the first symbol set. However, the terminal device sends no uplink information on the second symbol set. Specifically, there may be two cases:

1. A time occupied by the second symbol set is a time in which the terminal device detects that the terminal device is not allowed to access the channel of the target carrier.

Before sending the uplink information on the second symbol set, the terminal device needs to detect whether the terminal device is allowed to access the channel of the target carrier to send data. If detecting that the time occupied by the second symbol set is a time in which the terminal device is not allowed to access the channel of the target carrier, the terminal device sends no uplink information on an adjacent symbol set before the first symbol set.

2. The terminal device does not receive the indication information for scheduling, by the access network device, the terminal device to send the uplink information on the second symbol set.

The uplink information includes an SRS and/or a PUSCH.

For both of the foregoing two cases, the terminal device sends no uplink information on the second symbol set. To send the scheduled uplink information on the first symbol set, the terminal device performs channel detection in all or a part of the first time in the first symbol set to determine whether the terminal device is allowed to access the channel of the target carrier to send the uplink information. Otherwise, if the terminal device is, before the first symbol set, in a status of not being allowed to access the channel of the target carrier, and the terminal device does not, in a start location of the time occupied by the first symbol set, start to attempt to access the channel, the terminal device has no opportunity of sending the uplink information on the first symbol set. For these two cases, the first symbol set of the target carrier includes a symbol in a reference symbol set in an uplink subframe in which the first symbol set is located. Alternatively, the first symbol set neither includes a symbol in a reference symbol set in an uplink subframe in which the first symbol set is located nor includes at least one symbol after the reference symbol set in the uplink subframe in which the first symbol set is located.

Figure 6:
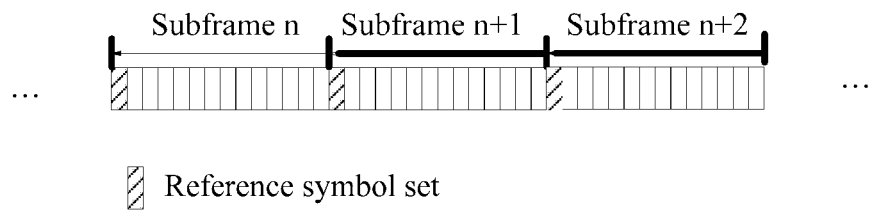
FIG. 6 is a schematic diagram showing that a symbol in a reference symbol set is the first symbol in an uplink subframe in Embodiment 1 of an uplink information transmission method according to the present invention.

The symbol in the reference symbol set is a symbol that is in the uplink subframe in which the first symbol set is located and that is occupied by a time used by the terminal device or another terminal device to detect whether the terminal device or the another terminal device is allowed to access the channel of the target carrier. The terminal device may determine, based on whether the first symbol set satisfies the foregoing condition, whether it is detected in all or a part of the first time in the first symbol set that the terminal device is allowed to access the channel of the target carrier; and determine, based on a detection result, whether to send the uplink information in a time in the time occupied by the first symbol set of the target carrier other than the first time. Specifically, an uplink subframe of a carrier on an unlicensed spectrum includes a reference symbol set. The reference symbol set includes the first symbol or the first two symbols in the uplink subframe. Alternatively, the reference symbol set includes the last symbol or the last two symbols in the uplink subframe. Optionally, a time that is included in the uplink subframe of the carrier on the unlicensed spectrum and that is used by the terminal device or another terminal device to detect whether the terminal device or the another terminal device is allowed to access the channel of the target carrier is a time in a time occupied by a symbol on a symbol index determined in the uplink subframe. FIG. 6 is a schematic diagram showing that the symbol in the reference symbol set is the first symbol in the uplink subframe in Embodiment 1 of the uplink information transmission method according to the present invention. As shown in FIG. 6, each uplink subframe includes a reference symbol set. An example in which a reference symbol set is the first symbol in each uplink subframe is used herein. A time occupied by a symbol in the reference symbol set in each uplink subframe is a time used by the terminal device or another terminal device to detect whether the terminal device or the another terminal device is allowed to access the channel of the target carrier. However, for an uplink subframe, a time occupied by a symbol in a reference symbol set in the uplink subframe may not be truly used by the terminal device to detect whether the terminal device is allowed to access the channel of the target carrier. When in an uplink subframe, there is at least one terminal device needing to detect whether the at least one terminal device is allowed to access a channel to send data, and when the access network device schedules a terminal device to send data in the uplink subframe, indication information of the access network device instructs the terminal device to send the data in a time that is in the uplink subframe and that does not include a time occupied by a symbol in a reference symbol set, to help the terminal device detecting whether the terminal device is allowed to access a channel obtain a detection result of being allowed to access the channel. When in an uplink subframe, there is no terminal device needing to detect whether the terminal device is allowed to access a channel to send data, and when the access network device schedules a terminal device to send data in the uplink subframe, indication information of the access network device instructs the terminal device to send the data in a time that is in the uplink subframe and that includes a time occupied by a symbol in a reference symbol set. That is, the reference symbol set is a symbol occupied by a time used by the terminal device or another terminal device to detect whether the terminal device or the another terminal device is allowed to access the channel of the target carrier. However, the access network device may determine, based on whether a beginning of an uplink burst of at least one terminal device is scheduled on a reference symbol set of an uplink subframe, whether to schedule a reference symbol in the uplink subframe to the terminal device to send the uplink information. If the beginning of the uplink burst of the at least one terminal device is scheduled on the reference symbol set of the uplink subframe, the access network device does not schedule the reference symbol in the uplink subframe to the terminal device to send the uplink information; or if the beginning of the uplink burst of the at least one terminal device is not scheduled on the reference symbol set of the uplink subframe, the access network device may schedule the reference symbol in the uplink subframe to the terminal device to send the uplink information. The uplink burst (UL burst) includes: after preempting an unlicensed frequency band resource, the terminal device transmits data by using the unlicensed frequency band resource without a competitive mechanism. A time length of the uplink burst is not greater than a maximum channel occupancy time (MCOT for short) of the user equipment on the unlicensed frequency band resource. Alternatively, another limitation may be imposed on the time length of the uplink burst.

Figure 7:
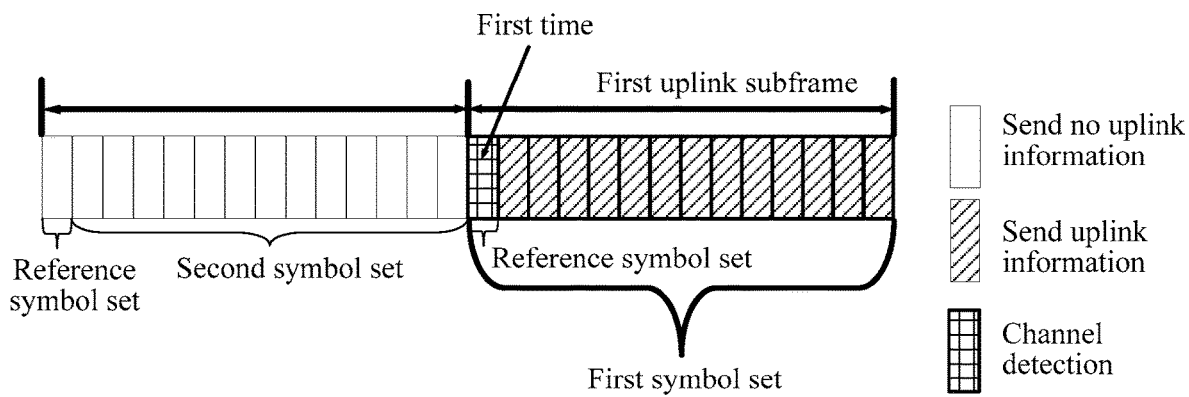
FIG. 7 is a schematic diagram of sending uplink information by a terminal device in a time in a time occupied by a first symbol set of a target carrier other than a first time in Embodiment 1 of an uplink information transmission method according to the present invention.

FIG. 7 is a schematic diagram of sending the uplink information by the terminal device in a time in the time occupied by the first symbol set of the target carrier other than the first time in Embodiment 1 of the uplink information transmission method according to the present invention. The first symbol set of the target carrier includes a symbol in a reference symbol set in an uplink subframe in which the first symbol set is located. The reference symbol set is the first symbol in the uplink subframe. If the terminal device determines that the first symbol set includes the first symbol in the uplink subframe in which the first symbol set is located and sends no uplink information on an adjacent symbol set before the first symbol set, and if the terminal device detects, in all or a part of a time of the first symbol in the first symbol set, that the terminal device is allowed to access the channel of the target carrier, the terminal device sends the uplink information in a time in the first symbol set of the target carrier other than the first symbol. As shown in FIG. 7, in addition to instructing, by using the indication information, the terminal device to send the uplink information on the first symbol set of the target carrier, the access network device further instructs, by using indication information, the terminal device to send uplink information on the second symbol set. The last symbol in symbols included in the second symbol set is adjacent in time to the first symbol in the first symbol set. For the access network device, it is assumed that the first symbol set and the second symbol set share one process of detecting whether the terminal device is allowed to access the channel. Therefore, the terminal device does not need to detect, in a time of the symbol in the reference symbol set in the uplink subframe in which the first symbol set is located, whether the terminal device is allowed to access the channel of the target carrier. If there is no other terminal device than the terminal device needing to detect, in the time of the symbol in the reference symbol set in the uplink subframe in which the first symbol set is located, whether the other terminal device is allowed to access the channel of the target carrier, the first symbol set includes the symbol in the reference symbol set in the uplink subframe. If the terminal device determines that the first symbol set includes the symbol in the reference symbol set in the uplink subframe in which the first symbol set is located and sends no uplink information on the second symbol set, and if the terminal device detects, in all or a part of the first time in the first symbol set, that the terminal device is allowed to access the channel of the target carrier, the terminal device sends the uplink information in a time in the time occupied by the first symbol set of the target carrier other than the first time. Certainly, if the terminal device detects, in all or a part of the first time in the first symbol set, that the terminal device is not allowed to access the channel of the target carrier, the terminal device sends no uplink information on the first symbol set of the target carrier.

Figure 8:
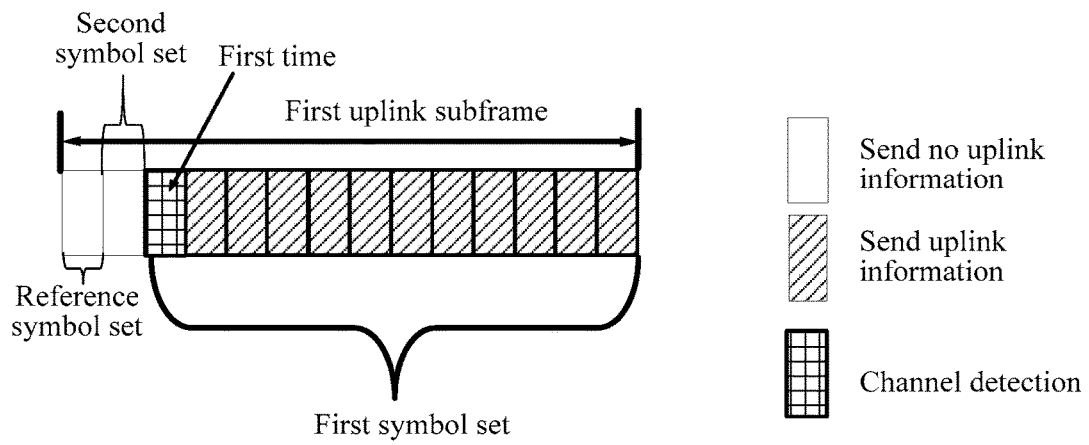
FIG. 8 is another schematic diagram of sending uplink information by a terminal device in a time in a time occupied by a first symbol set of a target carrier other than a first time in Embodiment 1 of an uplink information transmission method according to the present invention.

FIG. 8 is another schematic diagram of sending the uplink information by the terminal device in a time in the time occupied by the first symbol set of the target carrier other than the first time in Embodiment 1 of the uplink information transmission method according to the present invention. As shown in FIG. 8, in addition to instructing, by using the indication information, the terminal device to send the uplink information on the first symbol set of the target carrier, the access network device further instructs, by using indication information, the terminal device to send uplink information on at least one adjacent symbol set before the first symbol set of the target carrier. The first symbol set neither includes a symbol in a reference symbol set in an uplink subframe in which the first symbol set is located nor includes at least one symbol after the reference symbol set in the uplink subframe in which the first symbol set is located. For example, the access network device instructs the terminal device to send both an SRS and a PUSCH in the uplink subframe in which the first symbol set is located. A symbol set for sending the SRS is an adjacent symbol before the first symbol set. For the access network device, it is assumed that transmission channels corresponding to the first symbol set and an adjacent symbol set before the first symbol set share one process of detecting whether the terminal device is allowed to access the channel. Therefore, the terminal device detects, in a time of the symbol in the reference symbol set in the subframe in which the first symbol set is located, whether the terminal device is allowed to access the channel of the target carrier. It may be determined, based on a detection result, whether the first transmission channel, for example, an SRS, is sent on at least one symbol after the reference symbol set. If the terminal device determines that the first symbol set neither includes the symbol in the reference symbol set in the uplink subframe in which the first symbol set is located nor includes the at least one symbol after the reference symbol set in the uplink subframe in which the first symbol set is located, and sends no uplink information on the adjacent symbol set before the first symbol set, and if the terminal device detects, in all or a part of the first time in the first symbol set, that the terminal device is allowed to access the channel of the target carrier, the terminal device sends the uplink information in a time in the time occupied by the first symbol set of the target carrier other than the first time. For example, a symbol in a reference symbol set included in an uplink subframe of a carrier on an unlicensed spectrum is the first symbol in the uplink subframe. If the terminal device determines that the first symbol in the first symbol set is the third symbol in the uplink subframe, that is, the first symbol set neither includes the first symbol in the uplink subframe in which the first symbol set is located nor includes the second symbol in the uplink subframe, and sends no uplink information on the adjacent symbol set before the first symbol set, and the terminal device detects, in some or all of a time of the third symbol in the first symbol set, that the terminal device is allowed to access the channel of the target carrier, the terminal device sends the uplink information in a time in the first symbol set of the target carrier other than the first symbol.

Figure 9:
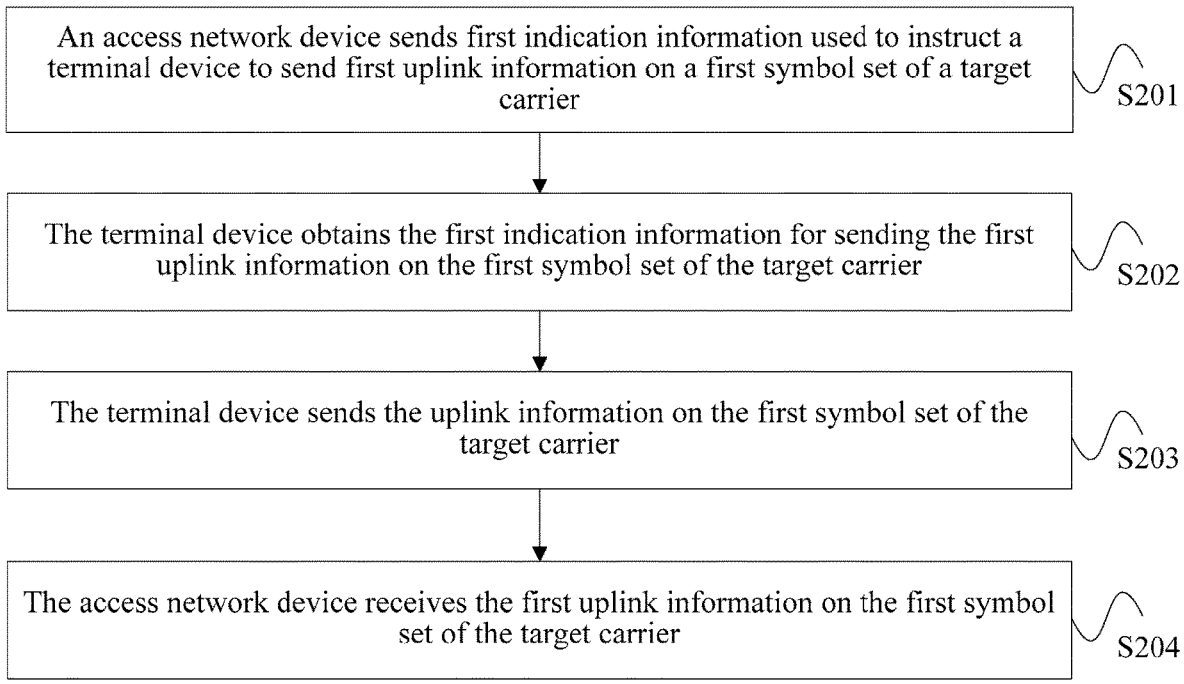
FIG. 9 is a schematic flowchart of Embodiment 2 of an uplink information transmission method according to the present invention.

FIG. 9 is a schematic flowchart of Embodiment 2 of an uplink information transmission method according to the present invention. As shown in FIG. 9, the method includes the following steps.

S201: An access network device sends first indication information used to instruct a terminal device to send first uplink information on a first symbol set of a target carrier.

Specifically, the first symbol set includes a plurality of symbols. The terminal device sends the uplink information in a time corresponding to a symbol included in the first symbol set of the target carrier. There is at least one symbol set that is before the first symbol set and that is a symbol set on which the access network device schedules the terminal device to send second uplink information, and the last symbol in symbols included in the at least one symbol set is adjacent in time to the first symbol in the first symbol set. The "before" herein is "before" in time.

S202: The terminal device obtains the first indication information for sending the first uplink information on the first symbol set of the target carrier.

S203: The terminal device sends the uplink information on the first symbol set of the target carrier.

Specifically, the terminal device sends no uplink information on an adjacent symbol set before the first symbol set.

S204: The access network device receives the first uplink information on the first symbol set of the target carrier.

Specifically, if determining that the terminal device sends no uplink information on the at least one symbol set or the symbol set adjacent to the first symbol set, the access network device performs S204. The first uplink information includes an SRS and/or a PUSCH.

Optionally, the access network device determines that the terminal device sends no uplink information on the at least one symbol set or the symbol set adjacent to the first symbol set. The determining, by the access network device, that the terminal device sends no uplink information on the at least one symbol set or the symbol set adjacent to the first symbol set is not limited herein. For example, the access network device may not detect a demodulation reference signal sent by the terminal device on a symbol occupied by the demodulation reference signal in the at least one symbol set and the symbol set adjacent to the first symbol set, to determine that the terminal device sends no uplink information on the at least one symbol set and the symbol set adjacent to the first symbol set. Alternatively, the access network device may determine, by using another method, that the terminal device sends no uplink information on the at least one symbol set and the symbol set adjacent to the first symbol set.

Further, before S203, the method further includes: detecting, by the terminal device, in a first time in a symbol 1 before the first symbol in the first symbol set, that the terminal device is allowed to access a channel of the target carrier.

Further, the at least one symbol set includes a second symbol set, the second symbol set is a symbol set on which the access network device instructs, by using second indication information, the terminal device to send the second uplink information, an uplink subframe in which the second symbol set is located includes a symbol 2, a second time in the symbol 2 is a time that is in the uplink subframe in which the second symbol set is located and that is used by the terminal device or another terminal device to detect whether the terminal device or the another terminal device is allowed to access the channel of the target carrier, and the symbol 2 does not overlap a symbol in the second symbol set.

In the uplink information transmission method provided in this embodiment, after obtaining the indication information for sending the uplink information on the first symbol set of the target carrier, the terminal device detects, before the first symbol set, whether the terminal device is allowed to access the channel. If being allowed to access the channel, the terminal device sends the uplink information on the first symbol set. When determining that the terminal device sends no uplink information on the adjacent symbol set before the first symbol set, the access network device receives the uplink information on the first symbol set. Therefore, when a plurality of symbol sets scheduled by the access network device to the terminal device share one channel detection, if a channel detection result of a previous symbol set is that the terminal device is not allowed to access the channel, the terminal device may further attempt to send the uplink information on a next symbol set, thereby improving channel use efficiency.

The process of the method shown in FIG. 9 is described below in detail by using a specific embodiment.

A terminal device obtains first indication information for sending first uplink information on a first symbol set of a target carrier. The first indication information may be an uplink scheduling grant sent by the access network device to the terminal device. The uplink scheduling grant is used to instruct the terminal device to send uplink information on a first symbol set in a first uplink subframe of the target carrier.

Figure 10:
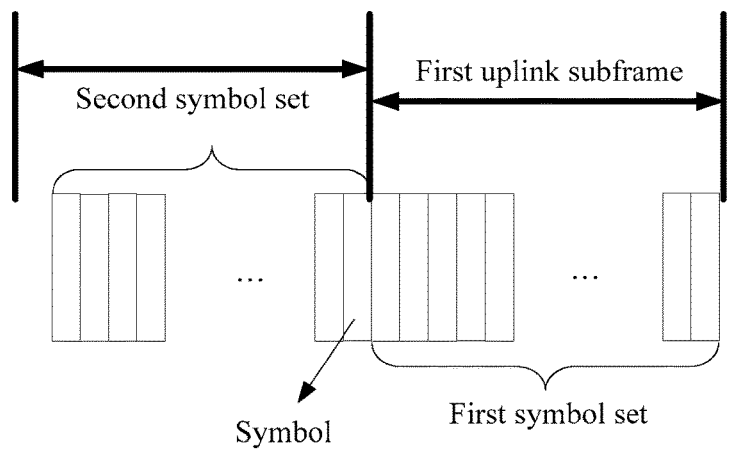
FIG. 10 is a schematic diagram of a symbol set used to instruct, by using indication information sent by an access network device, a terminal device to send uplink information on a target carrier in Embodiment 2 of an uplink information transmission method according to the present invention.
Figure 11:
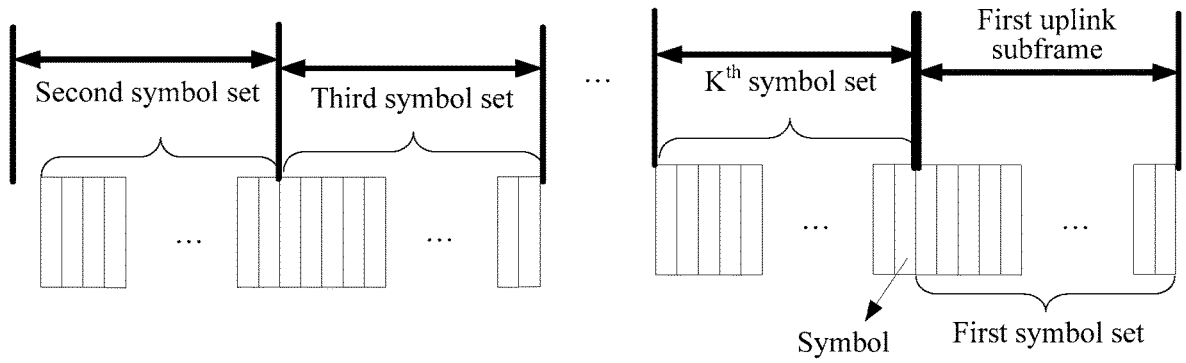
FIG. 11 is another schematic diagram of a symbol set used to instruct, by using indication information sent by an access network device, a terminal device to send uplink information on a target carrier in Embodiment 2 of an uplink information transmission method according to the present invention.

In addition, the access network device further schedules, on at least one symbol set before the first symbol set, the terminal device to send uplink information. The at least one symbol set includes a second symbol set for scheduling, by the access network device, the terminal device to send second uplink information, and the last symbol in symbols included in the at least one symbol set is adjacent in time to the first symbol in the first symbol set. Symbols included in the at least one symbol set are adjacent end to end. For example, the last symbol in the first symbol set in the at least one symbol set is adjacent in time to the first symbol in the second symbol set, the last symbol in the second symbol set is adjacent to the first symbol in the third symbol set, . . . , and the last symbol in the last but one symbol set is adjacent to the first symbol in the last symbol set. For example, FIG. 10 is a schematic diagram of a symbol set used to instruct, by using the indication information sent by the access network device, the terminal device to send the uplink information on the target carrier in Embodiment 2 of the uplink information transmission method according to the present invention. As shown in FIG. 10, the access network device further schedules, on a symbol set before the first symbol set, the terminal device to send uplink information. The symbol set before the first symbol set is the second symbol set. The uplink information that the access network device schedules, on the second symbol set, the terminal device to send is the second uplink information, and the last symbol in symbols included in the second symbol set is adjacent in time to the first symbol in the first symbol set. For another example, as shown in FIG. 11, FIG. 11 is another schematic diagram of a symbol set used to instruct, by using the indication information sent by the access network device, the terminal device to send the uplink information on the target carrier in Embodiment 2 of the uplink information transmission method according to the present invention. The access network device further schedules, on K symbol sets before the first symbol set, the terminal device to send uplink information. The first symbol set in the K symbol sets before the first symbol set is the second symbol set. Uplink information that the access network device schedules, on the second symbol set, the terminal device to send is the second uplink information, and the last symbol in symbols included in the K symbol sets is adjacent in time to the first symbol in the first symbol set, that is, every two of the K symbol sets are adjacent in time.

The access network device schedules, on the at least one symbol set before the first symbol set, the terminal device to send the uplink information. Scheduling the terminal device to send the second uplink information may be indicated to the terminal device by using second indication information sent by the access network device. The second indication information and the first indication information may be information in one piece of uplink scheduling grant information, or may be information in uplink scheduling grants independent from each other. The access network device may send an uplink scheduling grant once, to schedule the terminal device to send the first uplink information on the first symbol set and schedule the terminal device to send the uplink information on the at least one symbol set before the first symbol set. In addition, the at least one symbol set before the first symbol set includes the second symbol set. The access network device schedules the terminal device to send the second uplink information on the second symbol set herein. Alternatively, the access network device may separately send uplink scheduling grants for scheduling the terminal device to send the first uplink information on the first symbol set and for scheduling the terminal device to send uplink information on each of the at least one symbol set before the first symbol set.

Figure 12:
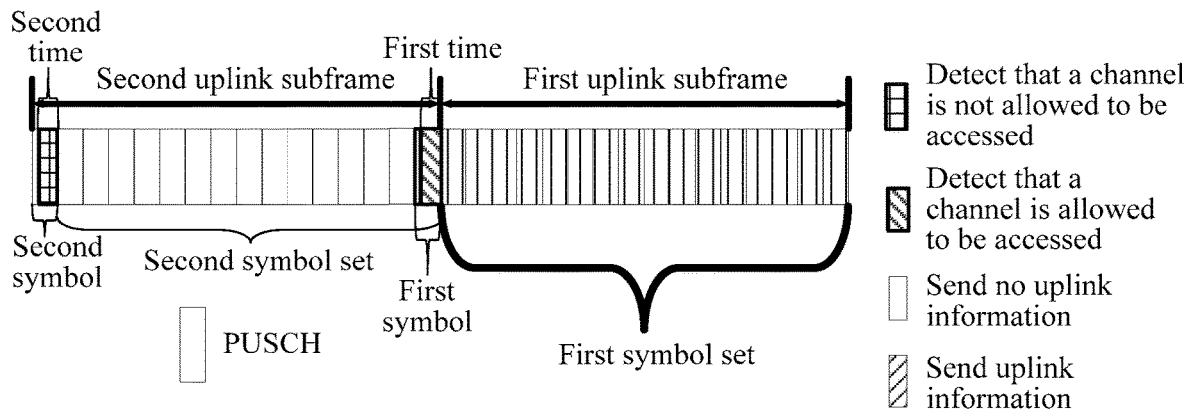
FIG. 12 is a schematic diagram of a symbol 1, a first time, a symbol 2, and a second time in Embodiment 2 of an uplink information transmission method according to the present invention.

Further, an uplink subframe in which the second symbol set is located includes a symbol 2. The symbol 2 includes at least one symbol, for example, includes one symbol or two symbols. A second time in the symbol 2 is a time that is in the uplink subframe in which the second symbol set is located and that is used by the terminal device or another terminal device to detect whether the terminal device or the another terminal device is allowed to access a channel of the target carrier. The symbol 2 does not overlap a symbol in the second symbol set. For example, uplink information that the access network device schedules, on the second symbol set, the terminal device to send is the second uplink information, and the last symbol in symbols included in the second symbol set is adjacent in time to the first symbol in the first symbol set. The uplink subframe in which the second symbol set is located is a second uplink subframe, and an uplink subframe in which the first symbol set is located is the first uplink subframe. FIG. 12 is a schematic diagram of a symbol 1, a first time, the symbol 2, and the second time in Embodiment 2 of the uplink information transmission method according to the present invention. As shown in FIG. 12, the first symbol in the second uplink subframe is the symbol 2, and the second symbol set includes the second to the 14$^{th}$ symbols in the second uplink subframe. All or a part of the second time in the symbol 2 is a time that is in the uplink subframe in which the second symbol set is located and that is used by the terminal device or another terminal device to detect whether the terminal device or the another terminal device is allowed to access the channel of the target carrier.

Specifically, a time that is included in an uplink subframe of a carrier on an unlicensed spectrum and that is used by the terminal device or another terminal device to detect whether the terminal device or the another terminal device is allowed to access the channel of the target carrier may be a time in a time occupied by the first symbol or the first two symbols in the uplink subframe, or may be a time in a time occupied by the last symbol or the last two symbols in the uplink subframe. Optionally, the time that is included in the uplink subframe of the carrier on the unlicensed spectrum and that is used by the terminal device or the another terminal device to detect whether the terminal device or the another terminal device is allowed to access the channel of the target carrier is a time in a time occupied by a symbol on a symbol index determined in the uplink subframe. A time that is in each uplink subframe and that is used by the terminal device or another terminal device to detect whether the terminal device or the another terminal device is allowed to access the channel of the target carrier is a time possibly used by the terminal device or the another terminal device to detect whether the terminal device or the another terminal device is allowed to access the channel of the target carrier. However, for an uplink subframe, a time occupied by a symbol in a reference symbol set in the uplink subframe may not be truly used by the terminal device to detect whether the terminal device is allowed to access the channel of the target carrier. When in an uplink subframe, there is at least one terminal device needing to detect whether the at least one terminal device is allowed to access a channel to send data, and when the access network device schedules a terminal device to send data in the uplink subframe, indication information of the access network device instructs the terminal device to send the data in a time that is in the uplink subframe and that does not include a time in which the terminal device or another terminal device detects whether the terminal device or the another terminal device is allowed to access the channel of the target carrier, to help the terminal device needing to detect whether the terminal device is allowed to access the channel obtain a detection result of being allowed to access the channel. When in an uplink subframe, there is no terminal device needing to detect whether the terminal device is allowed to access a channel to send data, and when the access network device schedules a terminal device to send data in the uplink subframe, indication information of the access network device instructs the terminal device to send the data in a time that is in the uplink subframe and that includes a time in which the terminal device or another terminal device detects whether the terminal device or the another terminal device is allowed to access the channel of the target carrier.

Further, before sending the first uplink information on the first symbol set of the target carrier, the terminal device detects, in the first time in the symbol 1 before the first symbol in the first symbol set, that the terminal device is allowed to access the channel of the target carrier. The symbol 1 includes at least one symbol, for example, includes one symbol or two symbols. Further, the terminal device detects, in the second time, that the terminal device is not allowed to access the channel of the target carrier. Alternatively, the terminal device does not receive the second indication information. The second time is all or a part of a time occupied by the symbol 2. The first time is all or a part of a time in the symbol 1. As shown in FIG. 12, the terminal device detects, in the second time, that the terminal device is not allowed to access the channel of the target carrier, and therefore cannot send the second uplink information on the second symbol set. The terminal device detects, in the first time, that the terminal device is allowed to access the channel of the target carrier, and therefore sends the first uplink information on the first symbol set. Certainly, if detecting, in the first time, that the terminal device is not allowed to access the channel of the target carrier, the terminal device does not send the first uplink information on the first symbol set.

Further, in another case, the terminal device may not receive the second indication information used to schedule the terminal device to send the second uplink information on the second symbol set. In this case, if detecting, in the first time, that the terminal device is allowed to access the channel of the target carrier, the terminal device sends the first uplink information on the first symbol set. In this case, the second indication information used to schedule the terminal device to send the second uplink information on the second symbol set and the first indication information used to schedule the terminal device to send the first uplink information on the first symbol set are information in uplink scheduling grants independent of each other.

In the foregoing example of this embodiment, the first uplink information includes a sounding reference signal SRS and/or a PUSCH; and/or the second uplink information includes an SRS and/or a PUSCH.

In the foregoing example, the symbol 1 is adjacent in time to the first symbol in the first symbol set, and the symbol 1 is located in an uplink subframe before the uplink subframe in which the first symbol set is located.

In the foregoing example, symbol indexes of the symbol 2 and the symbol 1 are different from each other in respective uplink subframes. For example, in FIG. 12, the symbol 2 is the first symbol in an uplink subframe, and the symbol 1 is the last symbol in the uplink subframe.

Figure 13:
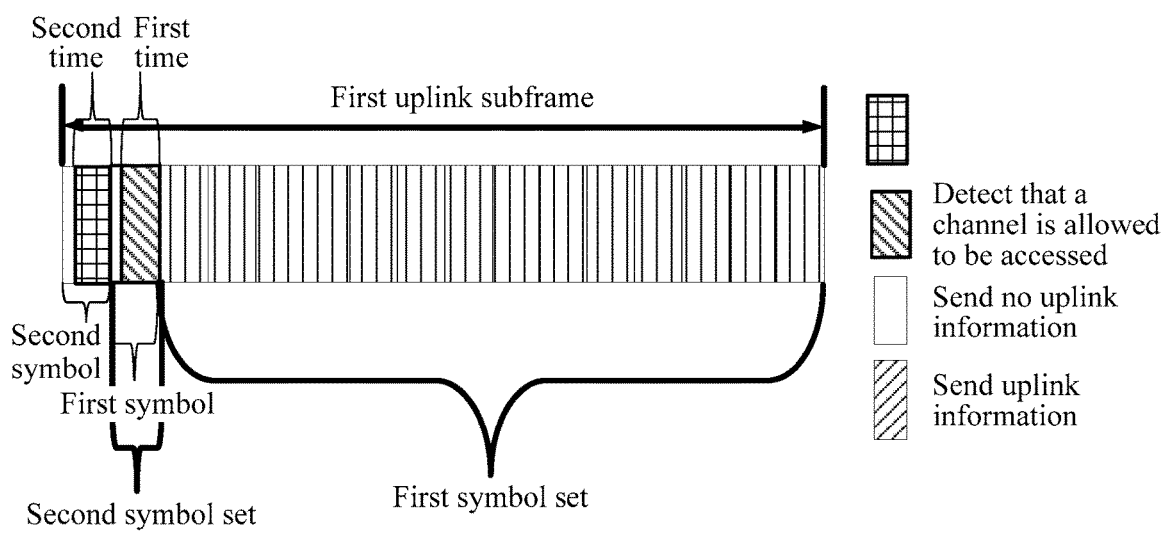
FIG. 13 is a schematic diagram of a symbol 1, a first time, a symbol 2, and a second time in Embodiment 2 of an uplink information transmission method according to the present invention.

In another implementation, the uplink subframe in which the second symbol set is located and the uplink subframe in which the first symbol set is located may be a same subframe, that is, the second uplink subframe and the first uplink subframe are a same subframe. The symbol 2 does not overlap a symbol in the second symbol set. All or a part of the second time in the symbol 2 is a time that is in the uplink subframe in which the second symbol set is located and that is used by the terminal device or another terminal device to detect whether the terminal device or the another terminal device is allowed to access the channel of the target carrier. Before sending the first uplink information on the first symbol set of the target carrier, the terminal device detects, in the first time in the symbol 1 before the first symbol in the first symbol set, that the terminal device is allowed to access the channel of the target carrier. The symbol 1 includes at least one symbol, for example, includes one symbol or two symbols. Further, the terminal device detects, in the second time, that the terminal device is not allowed to access the channel of the target carrier. Alternatively, the terminal device does not receive the second indication information. The second time is all or a part of a time occupied by the symbol 2. The first time is all or a part of a time in the symbol 1. FIG. 13 is a schematic diagram of the symbol 1, the first time, the symbol 2, and the second time in Embodiment 2 of the uplink information transmission method according to the present invention. As shown in FIG. 13, the first symbol in the first uplink subframe (that is, the second uplink subframe) is the symbol 2, and the second symbol set is the second symbol in the first uplink subframe. The second symbol in the first uplink subframe is the symbol 1, and the second uplink information is an SRS. The terminal device detects, in the second time, that the terminal device is not allowed to access the channel of the target carrier, and therefore cannot send the second uplink information on the second symbol set. The terminal device detects, in the first time, that the terminal device is allowed to access the channel of the target carrier, and therefore sends the first uplink information on the first symbol set. Certainly, if detecting, in the first time, that the terminal device is not allowed to access the channel of the target carrier, the terminal device does not send the first uplink information on the first symbol set.

Further, in another case, the terminal device may not receive the second indication information used to schedule the terminal device to send the second uplink information on the second symbol set. In this case, if detecting, in the first time, that the terminal device is allowed to access the channel of the target carrier, the terminal device sends the first uplink information on the first symbol set. In this case, the second indication information used to schedule the terminal device to send the second uplink information on the second symbol set and the first indication information used to schedule the terminal device to send the first uplink information on the first symbol set are information in uplink scheduling grants independent of each other.

In the foregoing example of this embodiment, the first uplink information includes a sounding reference signal SRS and/or uplink data; and/or the second uplink information includes a sounding reference signal SRS and/or uplink data.

In the foregoing example, the symbol 1 is adjacent in time to the first symbol in the first symbol set, and the symbol 1 is located in the uplink subframe in which the first symbol set is located.

In the foregoing example, symbol indexes of the symbol 2 and the symbol 1 are different from each other in the uplink subframe. For example, in FIG. 13, the symbol 2 is the first symbol in an uplink subframe and has a symbol index of 0 in the uplink subframe. The symbol 1 is the second symbol in the uplink subframe and has a symbol index of 1 in the uplink subframe.

Figure 14:
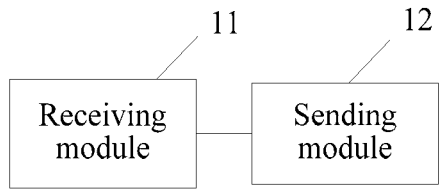
FIG. 14 is a schematic structural diagram of Embodiment 1 of a terminal device according to an embodiment of the present invention.

FIG. 14 is a schematic structural diagram of Embodiment 1 of a terminal device according to an embodiment of the present invention. As shown in FIG. 14, the terminal device includes a receiving module 11 and a sending module 12. The receiving module 11 is configured to obtain indication information for sending uplink information on a first symbol set of a target carrier. The sending module 12 is configured to send the uplink information in a second time in a time occupied by the first symbol set. The second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the terminal device is scheduled to send the uplink information.

Optionally, the first time is a time occupied by the first symbol or the first two symbols in the first symbol set.

Figure 15:
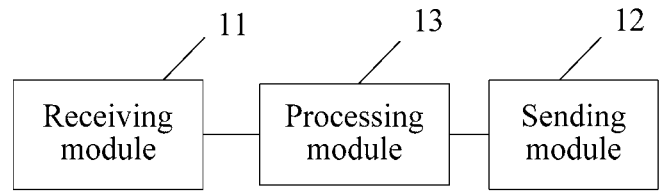
FIG. 15 is a schematic structural diagram of Embodiment 2 of a terminal device according to an embodiment of the present invention.

FIG. 15 is a schematic structural diagram of Embodiment 2 of a terminal device according to an embodiment of the present invention. As shown in FIG. 15, based on the terminal device shown in FIG. 14, further, the terminal device may further include a processing module 13. The processing module 13 is configured to: before the sending module 12 sends the uplink information in the second time in the time occupied by the first symbol set, detect, in all or a part of the first time, that the terminal device is allowed to access the channel of the target carrier.

Further, the sending module 12 sends no uplink information on the second symbol set.

The first symbol set includes a symbol in a reference symbol set in an uplink subframe in which the first symbol set is located; or the first symbol set neither includes a symbol in a reference symbol set in an uplink subframe in which the first symbol set is located nor includes at least one symbol after the reference symbol set in the uplink subframe in which the first symbol set is located, and the symbol in the reference symbol set is a time occupied by a time that is in the uplink subframe in which the first symbol set is located and that is used by the processing module 13 or another terminal device to detect whether the terminal device or the another terminal device is allowed to access the channel of the target carrier.

Specifically, the uplink information includes an SRS and/or a PUSCH.

The terminal device shown in FIG. 14 and FIG. 15 is configured to perform the foregoing method embodiment shown in FIG. 1, implementation principles and technical effects thereof are similar, and details are not described herein again.

Figure 16:
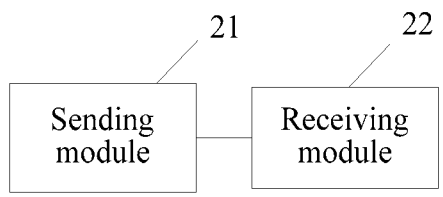
FIG. 16 is a schematic structural diagram of Embodiment 1 of an access network device according to an embodiment of the present invention.

FIG. 16 is a schematic structural diagram of Embodiment 1 of an access network device according to an embodiment of the present invention. As shown in FIG. 16, the access network device in this embodiment includes a sending module 21 and a receiving module 22. The sending module 21 is configured to send indication information used to instruct a terminal device to send uplink information on a first symbol set of a target carrier. The receiving module 22 is configured to receive the uplink information in a second time in a time occupied by the first symbol set. The second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the access network device schedules the terminal device to send the uplink information.

Optionally, the first time is a time occupied by the first symbol or the first two symbols in the first symbol set.

Figure 17:
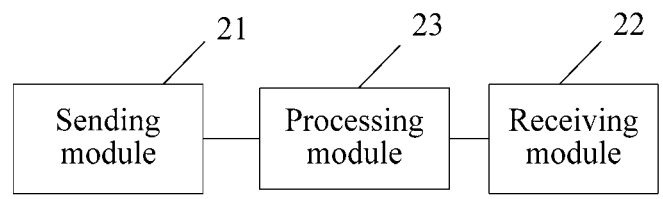
FIG. 17 is a schematic structural diagram of Embodiment 2 of an access network device according to an embodiment of the present invention.

FIG. 17 is a schematic structural diagram of Embodiment 2 of an access network device according to an embodiment of the present invention. As shown in FIG. 17, based on the access network device shown in FIG. 16, further, the access network device may further include a processing module 23. The processing module 23 is configured to determine that the terminal device sends no uplink information on the second symbol set.

Further, the first symbol set includes a symbol in a reference symbol set in an uplink subframe in which the first symbol set is located. Alternatively, the first symbol set neither includes a symbol in a reference symbol set in an uplink subframe in which the first symbol set is located nor includes at least one symbol after the reference symbol set in the uplink subframe in which the first symbol set is located. The symbol in the reference symbol set is a symbol that is in the uplink subframe in which the first symbol set is located and that is occupied by a time used by the terminal device or another terminal device to detect whether the terminal device or the another terminal device is allowed to access the channel of the target carrier.

Specifically, the uplink information includes an SRS and/or a PUSCH.

The access network device shown in FIG. 16 and FIG. 17 is configured to perform the foregoing method embodiment shown in FIG. 1, implementation principles and technical effects thereof are similar, and details are not described herein again.

Figure 18:
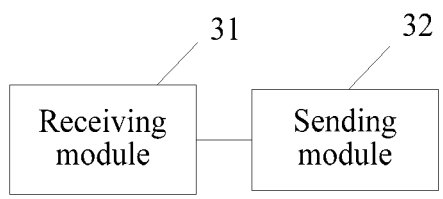
FIG. 18 is a schematic structural diagram of Embodiment 3 of a terminal device according to an embodiment of the present invention.

FIG. 18 is a schematic structural diagram of Embodiment 3 of a terminal device according to an embodiment of the present invention. As shown in FIG. 18, the terminal device includes a receiving module 31 and a sending module 32. The receiving module 31 is configured to obtain first indication information for sending first uplink information on a first symbol set of a target carrier. The sending module 32 is configured to send the first uplink information on the first symbol set. There is at least one symbol set that is before the first symbol set and that is a symbol set on which an access network device schedules the terminal device to send second uplink information, and the last symbol in symbols included in the at least one symbol set is adjacent in time to the first symbol in the first symbol set.

Figure 19:
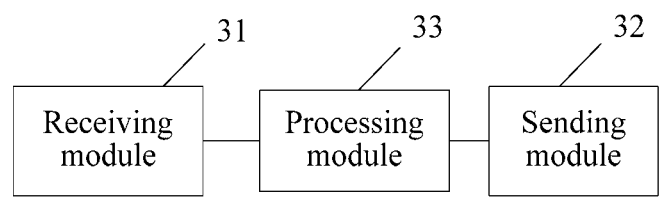
FIG. 19 is a schematic structural diagram of Embodiment 4 of a terminal device according to an embodiment of the present invention.

FIG. 19 is a schematic structural diagram of Embodiment 4 of a terminal device according to an embodiment of the present invention. As shown in FIG. 19, based on the terminal device shown in FIG. 18, the terminal device may further include a processing module 33. The processing module 33 is configured to: before the sending module 32 sends the first uplink information on the first symbol set, detect, in a first time in a symbol 1 before the first symbol in the first symbol set, that the terminal device is allowed to access a channel of the target carrier.

In the terminal device shown in FIG. 18 and FIG. 19, further, the at least one symbol set includes a second symbol set, and the second symbol set is a symbol set on which the access network device instructs, by using second indication information, the terminal device to send the second uplink information. An uplink subframe in which the second symbol set is located includes a symbol 2, a second time in the symbol 2 is a time that is in the uplink subframe in which the second symbol set is located and that is used by the processing module 33 or another terminal device to detect whether the terminal device or the another terminal device is allowed to access the channel of the target carrier, and the symbol 2 does not overlap a symbol in the second symbol set.

Optionally, the processing module 33 detects, in the second time, that the terminal device is not allowed to access the channel of the target carrier. Alternatively, the receiving module 31 does not receive the second indication information.

Optionally, the symbol 1 is adjacent in time to the first symbol in the first symbol set.

Specifically, the first uplink information includes an SRS and/or a PUSCH; and/or the second uplink information includes an SRS and/or a PUSCH.

The terminal device shown in FIG. 18 and FIG. 19 is configured to perform the foregoing method embodiment shown in FIG. 9, implementation principles and technical effects thereof are similar, and details are not described herein again.

Figure 20:
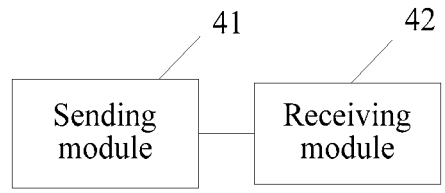
FIG. 20 is a schematic structural diagram of Embodiment 3 of an access network device according to an embodiment of the present invention.

FIG. 20 is a schematic structural diagram of Embodiment 3 of an access network device according to an embodiment of the present invention. As shown in FIG. 20, the access network device in this embodiment includes a sending module 41 and a receiving module 42. The sending module 41 is configured to send first indication information used to instruct a terminal device to send first uplink information on a first symbol set of a target carrier. The receiving module 42 is configured to receive the first uplink information on the first symbol set. There is at least one symbol set that is before the first symbol set and that is a symbol set on which the access network device schedules the terminal device to send second uplink information, and the last symbol in symbols included in the at least one symbol set is adjacent in time to the first symbol in the first symbol set.

Figure 21:
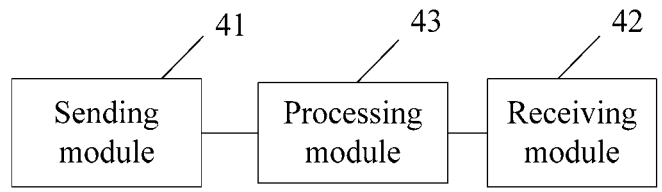
FIG. 21 is a schematic structural diagram of Embodiment 4 of an access network device according to an embodiment of the present invention.

FIG. 21 is a schematic structural diagram of Embodiment 4 of an access network device according to an embodiment of the present invention. As shown in FIG. 21, based on the access network device shown in FIG. 20, further, the access network device may further include a processing module 43. The processing module 43 is configured to determine that the terminal device sends no uplink information on the at least one symbol set or a symbol set adjacent to the first symbol set.

In the foregoing embodiment, the at least one symbol set includes a second symbol set, and the second symbol set is a symbol set on which the access network device instructs, by using second indication information, the terminal device to send the second uplink information. An uplink subframe in which the second symbol set is located includes a symbol 2, all or a part of a second time in the symbol 2 is a time that is in the uplink subframe in which the second symbol set is located and that is used by the terminal device or another terminal device to detect whether the terminal device or the another terminal device is allowed to access a channel of the target carrier, and the symbol 2 does not overlap a symbol in the second symbol set.

Specifically, the first uplink information includes a sounding reference signal SRS and/or a physical uplink shared channel PUSCH; and/or the second uplink information includes an SRS and/or a PUSCH.

The access network device shown in FIG. 20 and FIG. 21 is configured to perform the foregoing method embodiment shown in FIG. 9, implementation principles and technical effects thereof are similar, and details are not described herein again.

Figure 22:
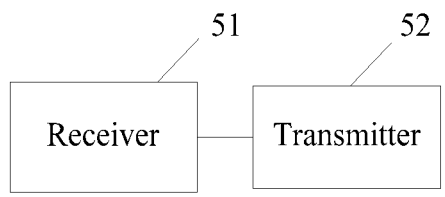
FIG. 22 is a schematic structural diagram of Embodiment 5 of a terminal device according to an embodiment of the present invention.

FIG. 22 is a schematic structural diagram of Embodiment 5 of a terminal device according to an embodiment of the present invention. As shown in FIG. 22, the terminal device includes a receiver 51 and a transmitter 52. The receiver 51 is configured to obtain indication information for sending uplink information on a first symbol set of a target carrier. The transmitter 52 is configured to send the uplink information in a second time in a time occupied by the first symbol set. The second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the terminal device is scheduled to send the uplink information.

Optionally, the first time is a time occupied by the first symbol or the first two symbols in the first symbol set.

Figure 23:
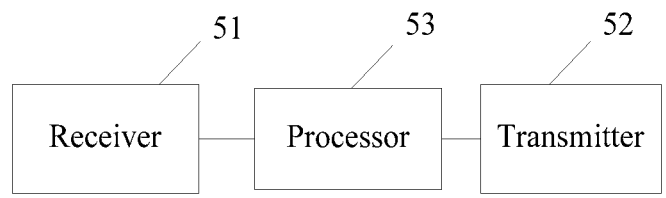
FIG. 23 is a schematic structural diagram of Embodiment 6 of a terminal device according to an embodiment of the present invention.

FIG. 23 is a schematic structural diagram of Embodiment 6 of a terminal device according to an embodiment of the present invention. As shown in FIG. 23, based on the terminal device shown in FIG. 22, further, the terminal device may further include a processor 53. The processor 53 is configured to: before the transmitter 52 sends the uplink information in the second time in the time occupied by the first symbol set, detect, in all or a part of the first time, that the terminal device is allowed to access the channel of the target carrier.

Further, the transmitter 52 sends no uplink information on the second symbol set.

The first symbol set includes a symbol in a reference symbol set in an uplink subframe in which the first symbol set is located; or the first symbol set neither includes a symbol in a reference symbol set in an uplink subframe in which the first symbol set is located nor includes at least one symbol after the reference symbol set in the uplink subframe in which the first symbol set is located, and the symbol in the reference symbol set is a time occupied by a time that is in the uplink subframe in which the first symbol set is located and that is used by the processor 53 or another terminal device to detect whether the terminal device or the another terminal device is allowed to access the channel of the target carrier.

Specifically, the uplink information includes an SRS and/or a PUSCH.

The terminal device shown in FIG. 22 and FIG. 23 is configured to perform the foregoing method embodiment shown in FIG. 1, implementation principles and technical effects thereof are similar, and details are not described herein again.

Figure 24:
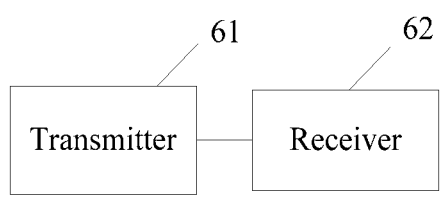
FIG. 24 is a schematic structural diagram of Embodiment 5 of an access network device according to an embodiment of the present invention.

FIG. 24 is a schematic structural diagram of Embodiment 5 of an access network device according to an embodiment of the present invention. As shown in FIG. 24, the access network device in this embodiment includes a transmitter 61 and a receiver 62. The transmitter 61 is configured to send indication information used to instruct a terminal device to send uplink information on a first symbol set of a target carrier. The receiver 62 is configured to receive the uplink information in a second time in a time occupied by the first symbol set. The second time is a time in the time occupied by the first symbol set other than a first time, and the second time is a time in which the terminal device is allowed to access a channel of the target carrier to send the uplink information. There is a second symbol set before the first symbol set, the last symbol in the second symbol set is adjacent in time to the first symbol in the first symbol set, and the second symbol set and the first symbol set are symbol sets on which the access network device schedules the terminal device to send the uplink information.

Optionally, the first time is a time occupied by the first symbol or the first two symbols in the first symbol set.

Figure 25:
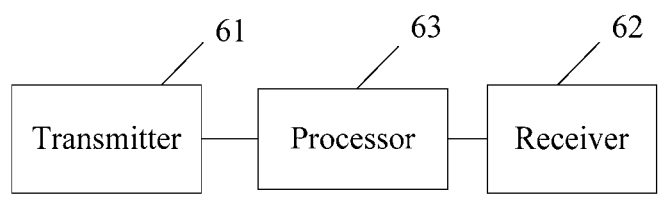
FIG. 25 is a schematic structural diagram of Embodiment 6 of an access network device according to an embodiment of the present invention.

FIG. 25 is a schematic structural diagram of Embodiment 6 of an access network device according to an embodiment of the present invention. As shown in FIG. 25, based on the access network device shown in FIG. 24, further, the access network device may further include a processor 63. The processor 63 is configured to determine that the terminal device sends no uplink information on the second symbol set.

Further, the first symbol set includes a symbol in a reference symbol set in an uplink subframe in which the first symbol set is located. Alternatively, the first symbol set neither includes a symbol in a reference symbol set in an uplink subframe in which the first symbol set is located nor includes at least one symbol after the reference symbol set in the uplink subframe in which the first symbol set is located. The symbol in the reference symbol set is a symbol that is in the uplink subframe in which the first symbol set is located and that is occupied by a time used by the terminal device or another terminal device to detect whether the terminal device or the another terminal device is allowed to access the channel of the target carrier.

Specifically, the uplink information includes an SRS and/or a PUSCH.

The access network device shown in FIG. 24 and FIG. 25 is configured to perform the foregoing method embodiment shown in FIG. 1, implementation principles and technical effects thereof are similar, and details are not described herein again.

Figure 26:
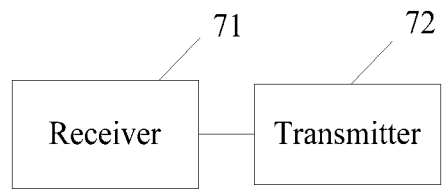
FIG. 26 is a schematic structural diagram of Embodiment 7 of a terminal device according to an embodiment of the present invention.

FIG. 26 is a schematic structural diagram of Embodiment 7 of a terminal device according to an embodiment of the present invention. As shown in FIG. 26, the terminal device includes a receiver 71 and a transmitter 72. The receiver 71 is configured to obtain first indication information for sending first uplink information on a first symbol set of a target carrier. The transmitter 72 is configured to send the first uplink information on the first symbol set. There is at least one symbol set that is before the first symbol set and that is a symbol set on which an access network device schedules the terminal device to send second uplink information, and the last symbol in symbols included in the at least one symbol set is adjacent in time to the first symbol in the first symbol set.

Figure 27:
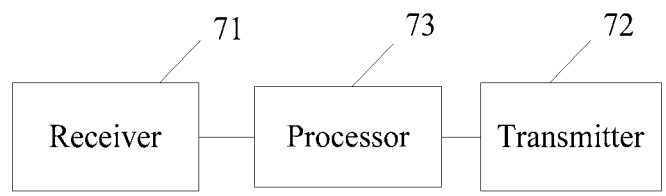
FIG. 27 is a schematic structural diagram of Embodiment 8 of a terminal device according to an embodiment of the present invention.

FIG. 27 is a schematic structural diagram of Embodiment 8 of a terminal device according to an embodiment of the present invention. As shown in FIG. 27, based on the terminal device shown in FIG. 26, further, the terminal device may further include a processor 73. The processor 73 is configured to: before the transmitter 72 sends the first uplink information on the first symbol set, detect, in a first time in a symbol 1 before the first symbol in the first symbol set, that the terminal device is allowed to access a channel of the target carrier.

In the terminal device shown in FIG. 26 and FIG. 27, further, the at least one symbol set includes a second symbol set, and the second symbol set is a symbol set on which the access network device instructs, by using second indication information, the terminal device to send the second uplink information. An uplink subframe in which the second symbol set is located includes a symbol 2, a second time in the symbol 2 is a time that is in the uplink subframe in which the second symbol set is located and that is used by the processor 73 or another terminal device to detect whether the terminal device or the another terminal device is allowed to access the channel of the target carrier, and the symbol 2 does not overlap a symbol in the second symbol set.

Optionally, the processor 73 detects, in the second time, that the terminal device is not allowed to access the channel of the target carrier. Alternatively, the receiver 71 does not receive the second indication information.

Optionally, the symbol 1 is adjacent in time to the first symbol in the first symbol set.

Specifically, the first uplink information includes an SRS and/or a PUSCH; and/or the second uplink information includes an SRS and/or a PUSCH.

The terminal device shown in FIG. 26 and FIG. 27 is configured to perform the foregoing method embodiment shown in FIG. 9, implementation principles and technical effects thereof are similar, and details are not described herein again.

Figure 28:
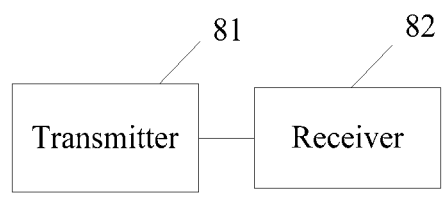
FIG. 28 is a schematic structural diagram of Embodiment 7 of an access network device according to an embodiment of the present invention.

FIG. 28 is a schematic structural diagram of Embodiment 7 of an access network device according to an embodiment of the present invention. As shown in FIG. 28, the access network device in this embodiment includes a transmitter 81 and a receiver 82. The transmitter 81 is configured to send first indication information used to instruct a terminal device to send first uplink information on a first symbol set of a target carrier. The receiver 82 is configured to receive the first uplink information on the first symbol set. There is at least one symbol set that is before the first symbol set and that is a symbol set on which the access network device schedules the terminal device to send second uplink information, and the last symbol in symbols included in the at least one symbol set is adjacent in time to the first symbol in the first symbol set.

Figure 29:
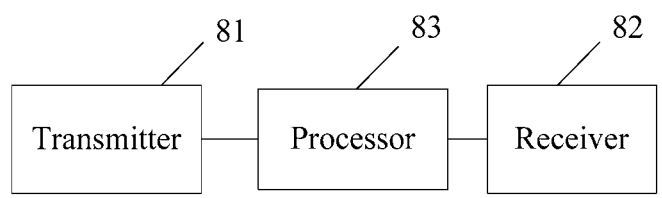
FIG. 29 is a schematic structural diagram of Embodiment 8 of an access network device according to an embodiment of the present invention.

FIG. 29 is a schematic structural diagram of Embodiment 8 of an access network device according to an embodiment of the present invention. As shown in FIG. 29, based on the access network device shown in FIG. 28, further, the access network device may further include a processor 83. The processor 83 is configured to determine that the terminal device sends no uplink information on the at least one symbol set or a symbol set adjacent to the first symbol set.

In the foregoing embodiment, the at least one symbol set includes a second symbol set, and the second symbol set is a symbol set on which the access network device instructs, by using second indication information, the terminal device to send the second uplink information. An uplink subframe in which the second symbol set is located includes a symbol 2, all or a part of a second time in the symbol 2 is a time that is in the uplink subframe in which the second symbol set is located and that is used by the terminal device or another terminal device to detect whether the terminal device or the another terminal device is allowed to access a channel of the target carrier, and the symbol 2 does not overlap a symbol in the second symbol set.

Specifically, the first uplink information includes a sounding reference signal SRS and/or a physical uplink shared channel PUSCH; and/or the second uplink information includes an SRS and/or a PUSCH.

The access network device shown in FIG. 28 and FIG. 29 is configured to perform the foregoing method embodiment shown in FIG. 9, implementation principles and technical effects thereof are similar, and details are not described herein again.

The embodiments in this specification are all described in a progressive manner, for same or similar parts in the embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment.

A person of ordinary skill in the art may understand that each aspect of this application or a possible implementation of each aspect may be specifically implemented as a system, a method, or a computer program product. Therefore, each aspect of this application or a possible implementation of each aspect may use forms of hardware only embodiments, software only embodiments (including firmware, resident software, and the like), or embodiments with a combination of software and hardware, which are uniformly referred to as "circuit", "module", or "system" herein. In addition, each aspect of this application or the possible implementation of each aspect may take a form of a computer program product, and the computer program product refers to computer-readable program code stored in a computer-readable medium.

The computer-readable medium may be a computer-readable signal medium or a computer-readable storage medium. The computer-readable storage medium includes but is not limited to an electronic, a magnetic, an optical, an electromagnetic, an infrared or a semiconductor system, device or apparatus or any proper combination thereof, such as a random access memory (RAM), a read-only memory (ROM), an erasable programmable read-only memory (EPROM or flash memory), an optical fiber, a portable read-only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a local computer of a user, or some may be executed on a local computer of a user as a standalone software package, or some may be executed on a local computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two steps or blocks that depend on an involved function and are shown in sequence may be actually executed concurrently, or sometimes these blocks may be executed in reverse order.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, performed by a terminal device, the method comprising:
   receiving, from a base station, an uplink scheduling grant, the uplink scheduling grant indicating at least two consecutive subframes comprising a first subframe and a second subframe, the first subframe is adjacent to the second subframe, and the second subframe is located before the first subframe;
   detecting, in a second time period, that the terminal device is not allowed to access a channel in the second subframe, the second time period being comprised in a starting symbol of the second subframe;
   detecting, in a first time period, that the terminal device is allowed to access the channel in the first subframe, wherein the first time period being comprised in a last symbol of the second subframe; and
   transmitting uplink information to the base station in the first subframe.

2. The method according to claim 1, wherein the uplink information comprises a sounding reference signal (SRS) and/or a physical uplink shared channel (PUSCH).

3. The method according to claim 1, wherein the second subframe is a starting subframe of the at least two consecutive subframes.

4. An apparatus comprising:
   a memory storage comprising instructions; and
   one or more processors in communication with the memory storage, wherein the one or more processors execute the instructions to:
   cooperate with a receiver to receive, from a base station, an uplink scheduling grant, the uplink scheduling grant indicating at least two consecutive subframes comprising a first subframe and a second subframe, the first subframe is adjacent to the second subframe, and the second subframe is located before the first subframe;
   detect, in a second time period, that the terminal device is not allowed to access a channel in the second subframe, the second time period being comprised in a starting symbol of the second subframe;
   detect, in a first time period, that the terminal device is allowed to access a channel in the first subframe, wherein the first time period being comprised in a last symbol of the second subframe; and
   cooperate with a transmitter to transmit the uplink information to the base station in the first subframe.

5. The apparatus according to claim 4, wherein the uplink information comprises a sounding reference signal (SRS) and/or a physical uplink shared channel (PUSCH).

6. The terminal device according to claim 4, wherein the second subframe is a starting subframe of the at least two consecutive subframes.

7. A non-transitory computer-readable medium comprising processor-executable instructions which, when executed by a processor, cause the processor to implement operations for uplink information transmission, the operations including:
   cooperating with a receiver to receive, from a base station, an uplink scheduling grant, the uplink scheduling grant indicating at least two consecutive subframes comprising a first subframe and a second subframe, the first subframe is adjacent to the second subframe, and the second subframe is located before the first subframe;
   detecting, in a second time period, that the terminal device is not allowed to access a channel in the second subframe, the second time period being comprised in a starting symbol of the second subframe;
   detecting, in a first time period, that the terminal device is allowed to access a channel in the first subframe, wherein the first time period being comprised in a last symbol of the second subframe; and
   cooperating with a transmitter to transmit the uplink information to the base station in the first subframe.

8. The non-transitory computer-readable medium according to claim 7, wherein the uplink information comprises a sounding reference signal (SRS) and/or a physical uplink shared channel (PUSCH).

9. The non-transitory computer-readable medium according to claim 7, wherein the second subframe is a starting subframe of the at least two consecutive subframes.

\* \* \* \* \*